(12) United States Patent
Sjöberg et al.

(10) Patent No.: US 11,272,178 B2
(45) Date of Patent: Mar. 8, 2022

(54) VIDEO ENCODING AND DECODING

(71) Applicant: Telefonaktiebolaget LM Ericsson (publ), Stockholm (SE)

(72) Inventors: Rickard Sjöberg, Stockholm (SE); Mitra Damghanian, Upplands-Bro (SE); Martin Pettersson, Vallentuna (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 0 days.

(21) Appl. No.: 16/640,405

(22) PCT Filed: Dec. 13, 2019

(86) PCT No.: PCT/SE2019/051275
§ 371 (c)(1),
(2) Date: Feb. 20, 2020

(87) PCT Pub. No.: WO2020/130912
PCT Pub. Date: Jun. 25, 2020

(65) Prior Publication Data
US 2021/0144372 A1    May 13, 2021

Related U.S. Application Data

(60) Provisional application No. 62/782,722, filed on Dec. 20, 2018.

(51) Int. Cl.
*H04N 19/119* (2014.01)
*H04N 19/147* (2014.01)
*H04N 19/174* (2014.01)
*H04N 19/70* (2014.01)

(52) U.S. Cl.
CPC ......... *H04N 19/119* (2014.11); *H04N 19/147* (2014.11); *H04N 19/174* (2014.11); *H04N 19/70* (2014.11)

(58) Field of Classification Search
CPC .. H04N 19/119; H04N 19/147; H04N 19/174; H04N 19/70
See application file for complete search history.

(56) References Cited

U.S. PATENT DOCUMENTS

2012/0183074 A1    7/2012   Fuldseth
2013/0101035 A1    4/2013   Wang et al.
(Continued)

FOREIGN PATENT DOCUMENTS

EP          3293981 A1       3/2018
KR      20180097106 A        8/2018
(Continued)

OTHER PUBLICATIONS

European Search Report for European Patent Application No. 19900513.3 dated Jan. 14, 2021, 4 pages.
(Continued)

*Primary Examiner* — Jonathan R Messmore
(74) *Attorney, Agent, or Firm* — Sage Patent Group

(57) ABSTRACT

A method for decoding a picture from a bitstream, includes decoding a first part of the bitstream to form an address mapping that maps a segment group index value to a segment group address; and decoding a second part of the bitstream. The second part of the bitstream includes code words representing the plurality of segment groups. Decoding the second part of the bitstream includes decoding a first segment group. Decoding the first segment group includes: 1) decoding a first segment group index value for the first segment group; 2) determining a first segment group address for the first segment group; 3) determining a first spatial location for the first segment group; and 4) decoding at least one sample value for the first segment group and assigning the at least one sample value to a location in the decoded picture given by the first spatial location.

20 Claims, 14 Drawing Sheets

(56) References Cited

U.S. PATENT DOCUMENTS

| | | | |
|---|---|---|---|
| 2014/0079126 A1* | 3/2014 | Ye | H04N 19/17 375/240.16 |
| 2014/0307775 A1 | 10/2014 | Ouedraogo et al. | |
| 2016/0124841 A1* | 5/2016 | Nito | G06F 3/0659 711/102 |
| 2016/0321294 A1* | 11/2016 | Wang | H04L 67/1097 |
| 2017/0347109 A1 | 11/2017 | Hendry et al. | |
| 2018/0103199 A1 | 4/2018 | Hendry et al. | |
| 2018/0277164 A1 | 9/2018 | Wang | |
| 2018/0357234 A1* | 12/2018 | De | G06F 16/24569 |
| 2019/0080107 A1* | 3/2019 | Gupta | G06F 21/6227 |

FOREIGN PATENT DOCUMENTS

| | | | |
|---|---|---|---|
| WO | 2015197815 A1 | 12/2015 | |
| WO | 2015197818 A1 | 12/2015 | |
| WO | 2018046705 A2 | 3/2018 | |

OTHER PUBLICATIONS

Sjöberg et al., "Tile Groups for VVC," Joint Video Experts Team (JVET) of ITU-T SG 16 WP 3 and ISO/IEC JTC 1/SC 29/WG 11, 12th Meeting: Macao, CN, Oct. 3-12, 2018, Document: JVET-L0415-v 1,4 pages.

Communication pursuant to Article 94(3) EPC for European Patent Application No. 19900513.3 dated Jul. 2, 2021, 5 pages.

International Search Report and Written Opinion of the International Searching Authority for PCT International Application No. PCT/SE2019/051275 dated Mar. 17, 2020.

Sjöberg et al., "AHG12: Merge friendly tile group address signalling," Joint Video Experts Team (JVET) of ITU-T SG 16 WP 3 and ISO/IEC JTC 1/SC 29/WG 11, 14th Meeting: Marrakesh, MA, Jan. 9-18, 2019, Document: JVET-M0373-v1, 5 pages.

Communication of European Search Report and Opinion for European Patent Application No. 21166424.8 dated Jul. 3, 2021, 8 pages.

* cited by examiner

VIDEO ENCODING AND DECODING

CROSS REFERENCE TO RELATED APPLICATIONS

This application is a 35 U.S.C. § 371 national stage application of PCT International Application No. PCT/SE2019/051275, filed on Dec. 13, 2019, which itself claims priority to U.S. Provisional Application No. 62/782,722 filed Dec. 20, 2018, the disclosure and content of both of which are incorporated herein by reference in their entireties.

TECHNICAL FIELD

Disclosed are embodiments related to video encoding and decoding.

BACKGROUND

High Efficiency Video Coding (HEVC) is a block-based video codec standardized by ITU-T and MPEG that utilizes both temporal and spatial prediction. In the encoder, the difference between the original pixel data and the predicted pixel data (referred to as the residual) is transformed into the frequency domain, quantized, and then entropy-coded, before being transmitted together with necessary prediction parameters such as prediction mode and motion vectors (these prediction parameters are also entropy-coded). By quantizing the transformed residuals, a tradeoff between bitrate and quality of the video may be controlled. The decoder performs entropy decoding, inverse quantization, and inverse transformation, to obtain the residual; and then adds the residual to an intra- or inter-prediction to reconstruct a picture.

MPEG and ITU-T are working on the successor to HEVC within the Joint Video Exploratory Team (JVET). The name of this video codec under development is Versatile Video Coding (VVC).

The draft VVC video coding standard uses a block structure referred to as a quadtree-plus-binary-tree-plus-ternary-tree block structure (QTBT+TT), where each picture is first partitioned into square blocks called coding tree units (CTUs). The size of all CTUs are identical and the partition is done without any syntax controlling it. Each CTU is further partitioned into coding units (CUs) that can have either square or rectangular shapes. The CTU is first partitioned by a quad-tree structure; then it may be further partitioned with equally sized partitions, either vertically or horizontally, in a binary structure to form CUs. A block could thus have either a square or rectangular shape. The depth of the quad tree and binary tree can be set by the encoder in the bitstream. An example of dividing a CTU using QTBT is illustrated in FIG. 1. The ternary tree (TT) part of the structure adds the possibility to divide a CU into three partitions instead of two equally sized partitions; this increases the possibilities to use a block structure that better fits the content structure in a picture.

The draft VVC video coding standard includes a tool called tiles that divides a picture into rectangular spatially-independent regions. Tiles in the draft VVC coding standard are very similar to the tiles used in HEVC. Using tiles, a picture in VVC can be partitioned into rows and columns of samples where a tile is an intersection of a row and a column. FIG. 2 shows an example of a tile partitioning using 4 tile rows and 5 tile columns, resulting in a total of 20 tiles for the picture.

The tile structure is signaled in the picture parameter set (PPS) by specifying the thicknesses of the rows and the widths of the columns. Individual rows and columns can have different sizes, but the partitioning always span across the entire picture, from left to right and top to bottom respectively.

The PPS syntax used for specifying the tile structure in the draft VVC standard is listed in Table 1. First, there is a flag single_tile_in_pic_flag indicating if tiles are used or not. If the flag is set equal to 0, the number of tile columns and rows are specified. The uniform_tile_spacing_flag is a flag specifying whether the column widths and row heights are explicitly signaled or whether a pre-defined method to space the tile borders evenly should be used. If explicit signaling is indicated, the column widths are signaled sequentially followed by the row heights. Finally, the loop_filter_across_tiles_enabled_flag specifies whether in-loop filters across tile boundaries are turned on or off for all tile boundaries in the picture. The tile syntax also includes raw byte sequence payload (RBSP) trailing bits.

TABLE 1

Tile syntax in the draft VVC standard

| | Descriptor |
|---|---|
| pic_parameter_set_rbsp( ) { | |
|   pps_pic_parameter_set_id | ue(v) |
|   pps_seq_parameter_set_id | ue(v) |
|   transform_skip_enabled_flag | u(1) |
|   single_tile_in_pic_flag | u(1) |
|   if( !single_tile_in_pic_flag ) { | |
|     num_tile_columns_minus1 | ue(v) |
|     num_tile_rows_minus1 | ue(v) |
|     uniform_tile_spacing_flag | u(1) |
|     if( !uniform_tile_spacing_flag ) { | |
|       for( i = 0; i < num_tile_columns_minus1; i++ ) | |
|         tile_column_width_minus1[ i ] | ue(v) |
|       for( i = 0; i < num_tile_rows_minus1; i++ ) | |
|         tile_row_height_minus1[ i ] | ue(v) |
|     } | |
|     loop_filter_across_tiles_enabled_flag | u(1) |
|   } | |
|   rbsp_trailing_bits( ) | |
| } | |

There is no decoding dependency between tiles of the same picture. This includes intra-prediction, context selection for entropy coding, and motion vector prediction. One exception is that in-loop filtering dependencies are generally allowed between tiles.

The bits of a coded picture in VVC is partitioned into tile_group_layer_rbsp( ) data chunks, where each such chunk is encapsulated into its own group network abstraction layer (NAL) unit. The data chunk consists of a tile group header and tile group data, where the tile group data consists of an integer number of coded complete tiles. Table 2 shows the related draft VVC specification standard syntax. The tile_group_header( ) and tile_group( ) data syntax is further described below.

TABLE 2

Tile group layer in the draft VVC standard

| | Descriptor |
|---|---|
| tile_group_layer_rbsp( ) { | |
|     tile_group_header( ) | |
|     tile_group_data( ) | |
|     rbsp_tile_group_trailing_bits( ) | |
| } | |

The tile group header starts with a tile_group_pic_parameter_set_id syntax element. This element specifies the picture parameter set (PPS) that should be activated and used for decoding the tile group (see Table 1). The tile group address code word specifies the tile address of the first tile in the tile group. The address is signaled as a number between 0 and n−1, where n is the number of tiles in the picture. Using FIG. 2 as an example, the number of tiles there is equal to 20, so the valid tile group address values for this picture is between 0 and 19. The tile address specifies the tiles in raster scan order and are shown in the bottom part of FIG. 2. A decoder decodes this address value, and by using the tile structure information decoded from the active PPS, the decoder can derive the spatial coordinates of the first tile in the picture. If we assume, for instance, that the tiles in FIG. 2 all have the same size of 256×256 luma samples, a tile address of 8 means that the y-coordinate of the first tile in the tile group is int(8/5)*256=1*256=256 and the x-coordinate is (8%5)*256=3*256=768 in luma samples.

TABLE 3

Tile group header in the draft VVC standard

| | Descriptor |
|---|---|
| tile_group_header( ) { | |
|     tile_group_pic_parameter_set_id | ue(v) |
|     if( NumTilesInPic > 1 ) { | |
|         tile_group_address | u(v) |
|         num_tiles_in_tile_group_minus1 | ue(v) |
|     } | |
|     ... | |
|     if( num_tiles_in_tile_group_minus1 > 0 ) { | |
|         offset_len_minus1 | ue(v) |
|         for( i = 0; i < num_tiles_in_tile_group_minus1; i++ ) | |
|             entry_point_offset_minus1[ i ] | u(v) |
|     } | |
|     byte_alignment( ) | |
| } | |

The tile group data contains all CTUs in the tile group. First, there is a for loop over all tiles in the tile group. Inside that loop there is a for loop over all CTUs in the tile. Note that the number of CTUs in different tiles may differ as the tile row heights and tile column widths do not have to be equal. For entropy-coding reasons, there is a bit set to one at the end of each tile. Each tile ends with a byte alignment which means that the data for each tile in the tile group starts on an even byte address in the bitstream. This is necessary for entry points to be specified in number of bytes. Note that the tile group header also ends with a byte alignment.

TABLE 4

Tile group data in the draft VVC standard

| | Descriptor |
|---|---|
| tile_group_data( ) { | |
|     tileIdx = tile_group_address | |
|     for( i = 0; i <= num_tiles_in_tile_group_minus1; i++, tileIdx++ ) { | |
|         ctbAddrInTs = FirstCtbAddrTs[ tileIdx ] | |
|         for( j = 0; j < NumCtusInTile[ tileIdx ]; j++, ctbAddrInTs++ ) { | |
|             CtbAddrInRs = CtbAddrTsToRs[ ctbAddrInTs ] | |
|             coding_tree_unit( ) | |
|         } | |
|         end_of_tile_one_bit /* equal to 1 */ | ae(v) |
|         if( i < num_tiles_in_tile_group_minus1 ) | |
|             byte_alignment( ) | |
|     } | |
| } | |

The next code word in the tile group header, num_tiles_in_tile_group_minus1, specifies the number of tiles there are in the tile group. If there are more than one tile in the tile group, the entry points of the tiles except the first one is signaled. First, there is a code word, offset_len_minus1, that specifies the number of bits used for signaling each of the offsets. Then, there is a list of entry point offset code words, entry_point_offset_minus1. These specifies byte offsets in the bitstream that can be used by a decoder to find the starting point of each tile in order to decode them in parallel. Without these offsets, a decoder would have to parse tile data in order to find out where each tile starts in the bitstream. The first tile in the tile group immediately follows after the tile group header, so there is no byte offset sent for that tile. This means that the number of offsets is one less than the number of tiles in the tile group.

The header overhead for the tiles consist of the signaling the address, the number of tiles in the tile group, byte alignments, and entry point offsets for each tile. In the draft VVC standard, the inclusion of entry point offsets in the tile group header is mandatory when tiles are enabled.

Entry point offsets also simplify extraction and stitching of tile groups or tiles to re-constitute them into an output stream. This requires some encoder-side constraints to make the tile groups or tiles temporally independent. One of the encoder constraints is that motion vectors needs to be restricted so that motion compensation for a tile group or tile only uses samples included in spatially co-located regions of previous pictures. Another constraint is to restrict temporal motion vector prediction (TMVP) such that this process is made temporally independent of regions that are not co-located. For complete independence, it is also required to disable in-loop filtering between tile groups or tiles.

Tiles are sometimes used for extraction and stitching of 360-degree video that is intended for consumption using head-mounted display (HMD) devices. The field-of-view when using today's HMD devices is limited to around 20% of the full sphere, which means that only 20% of the full 360-degree video is consumed by the user. It is common that the entire 360-degree video sphere is made available to the HMD device and that the device then crops out the part that is rendered for the user. That part, i.e. what part of the sphere the user sees, is called the viewport. A well-known optimization of resources is to make the HMD device video system aware of head movements and the direction the user is looking so that less resources are spent on processing video samples that are not rendered to the user. The resources here can be bandwidth from a server to a client or the decoding capability of the device. For future HMD devices with a field of view larger than the current state of the art, a non-uniform resource allocation would still be beneficial as the human vision system demands for a higher image quality in the central vision area (about 18° horizontal view) while it puts lower demand on the image quality in the peripheral region (about 120° or more for a comfortable horizontal view).

Optimizing resources to the Region of Interest (ROI) is another use case for tiles. The ROI can be specified in the content or extracted by methods such as eye tracking.

One state-of-the-art method of using head movements to reduce the amount of required resources is to use tiles. This can be done by first encoding the video sequence multiple times where the tile partitioning structure is the same in all encodings. The encodings are done at different video qualities, which results in at least one high-quality encoding and one low-quality encoding. This means that for each tile location at a particular point in time, there are at least one high-quality tile representation and at least one low-quality tile representation. The difference between a high-quality tile and a low-quality tile can be that the high-quality tile is encoded at a higher bitrate than the low-quality tile, or that the high-quality tile is of higher resolution than the low-quality tile.

FIG. 3 shows an example of an encoding of a video into one stream 302 having high-quality tiles and another stream 304 having low-quality tiles. We assume here that each tile is put in its own tile group. Tiles are in the VVC draft numbered in raster scan order, which is here shown using white text. These tile numbers are used as tile group addresses. Depending on where the user is looking, the client requests tiles of different qualities such that the tiles that correspond to where the user is looking are received in high quality and the tiles where the user is not looking are received in low quality. The client then stitches the tiles together in the bitstream domain and feeds the output bitstream to a video decoder. For example, FIG. 3 shows an output stream 306 after stitching, where tile columns 310 and 316 (the two outer columns) consist of tiles from the low quality stream 304; and where tile columns 3123 and 316 (the two inner columns) consist of tiles from the high quality stream 302. Note that the width of the output picture is smaller than the inputs. The reason is that we assume here that no tiles at all are requested for the area behind where the user is looking.

SUMMARY

It is important that the stitching is done such that the output bitstream is compliant with a bitstream specification (such as the future published VVC specification) so that any standards-compliant decoder without any modifications can be used to decode the output stream. In order for the stitching example shown in FIG. 3 to be compliant with the VVC draft specification, the tile group addresses (the tile_group_address code words in the tile group header) need to be updated by the stitcher. For example, the tile group address for the bottom-right tile group in the output picture must be set equal to 15 while the tile group address for that tile in the input low- and high-quality streams is equal to 19.

Embodiments are provided that improve encoding and decoding video, e.g. to improve stitching of tiles together. This disclosure also introduces the terms segment groups, segments, and units. As used here, the term segment is a more general term than tiles (what is used in the VVC draft), and it is noted that embodiments are applicable to different kinds of picture partitioning schemes and not only tile partitions known from HEVC and the VVC draft. As used here, a "tile" from these drafts is one example of a segment, but there may also be other examples of segments.

As shown in FIG. 4, a single picture 402 of a video stream is partitioned in a variety of ways. For example, picture 402 is partitioned into units 410, segments 412, and segment groups 414. As shown, picture 402 includes 64 units 410 (top of FIG. 4), 16 segments 412 (middle of FIG. 4), and 8 segment groups 414 (bottom of FIG. 4). As shown, a partition structure 413 of picture 402 (shown by dashed lines) defines the segments 412. Each segment 412 includes a number of units 410. A segment 412 may include an integral number of complete units or a combination of complete and partial units. A number of segments 412 forms a segment group 414. The segment group may include segments in raster scan order. Alternatively, the segment group may include any group of segments that together form a rectangle. Alternatively, the segment group may consist of any subset of segments.

As shown in FIG. 5, a picture 402 may be partitioned by a partition structure (shown in dashed lines) into a number of segments; here, there are four segments shown, including segments 502 and 504. FIG. 5 also shows three units 510, 512, and 514; two of these units (512 and 514) belong to the current segment 504, and one of the units (510) belongs to a different, neighboring segment 502. The segments are independent with respect to other segments, which means that segment boundaries are handled similar to picture boundaries when decoding the units. This affects the derivation process of elements during decoding, such as e.g. the derivation of intra-prediction modes and the derivation of quantization parameter values.

Intra-prediction modes are well known in the current art and are used and signaled for units that only use prediction from previously decoded samples of the current picture for sample prediction. It is common that the derivation of the intra-prediction mode in a current unit 512 depends on previously derived intra-prediction modes in other, neighboring units 514. With segments being independent, the derivation of the intra-prediction mode in a current unit 512 may only depend on previously derived intra-prediction modes in units 514 that belong to the current segment 504 and may not depend on any intra-prediction mode in any unit 510 that belongs to a different segment 502.

This means that the partition structure in FIG. 5 makes the intra-prediction modes in units 510 in a different segment 502 unavailable for the derivation of the intra-prediction mode for the units 512 in a current segment 504. Accordingly, the segment boundary may have the same effect on the intra-prediction mode derivation as a picture boundary for the units 512 in a current segment 504. Note that the mode in some units 510 in a different segment 502 may well have been used for derivation of an intra-prediction mode in a unit 512 in a current segment 504 if those units would have belonged to the same segment.

As used here, a segment may (in some cases) be equivalent to a tile or slice, and these terms may therefore be used interchangeably. Likewise, a segment group may (in some cases) be equivalent to a tile group, and a unit may (in some cases) be equivalent to a CTU.

As explained above, processes may desire to take as input one or more bitstreams and produce an output bitstream by selecting tiles from the one or more input bitstreams; such a process may be referred to as a stitching process. A problem with existing video encoding and decoding solutions is that data of the tile group layer may be required to be modified by a stitching process in order to produce an output bitstream that is compliant with a bitstream specification, such as the future published VVC specification. This makes stitching highly computationally complex since the number of packets per second that must be rewritten can become very high. Consider, for example, a frame rate of 60 frames per second (fps), where each picture includes 16 tile groups. If each tile is put in its own packet, then 960 (=60*16) packets per second may need to be rewritten.

Another problem with existing video encoding and decoding solutions is that extraction, stitching, and/or relocation of tiles in the bitstream without modifying the tile group layer parts of the bitstream is not possible.

Embodiments overcome these and other problems by replacing the current tile address signaling by an index value in the tile group header and by conveying a mapping between such index values to tile addresses. This mapping may be conveyed, for instance, in a parameter set such as the PPS. If the index values are set with stitching in mind during encoding, the index values can be kept as-is during stitching (e.g. when encoding versions, such as of differing quality, the encoder may enforce the condition that index values are unique across the different versions). Changes of tile group addresses can then be done by only modifying the mapping of index values to tile addresses in the parameter set.

In order to facilitate extraction, stitching, and/or relocation of tiles in the bitstream without modifying the tile group layer parts of the bitstream, embodiments provide a mapping between index values and the number of tiles in the tile group in the parameter set, where the index is sent in the tile group header.

Advantages of embodiments include allowing stitching to be performed by rewriting the parameter set only, while the tile group headers are kept as-is. If we take the 60 fps example above and assume that parameter sets are sent as a packet once per second in the bitstream, then embodiments would require rewriting at most 1 packet per second instead of 961 packets per second. Thus, the computational complexity of stitching is reduced significantly.

According to a first aspect, a method is provided for decoding a picture from a bitstream, the picture being partitioned into a plurality of segment groups. The method includes decoding a first part of the bitstream to form an address mapping that maps a segment group index value to a segment group address; and decoding a second part of the bitstream. The second part of the bitstream comprises code words representing the plurality of segment groups. Decoding the second part of the bitstream comprises decoding a first segment group. Decoding the first segment group includes: 1) decoding a first segment group index value for the first segment group; 2) determining a first segment group address for the first segment group based on the first segment group index value and the address mapping; 3) determining a first spatial location for the first segment group based on the first segment group address, the first spatial location representing a location of the first segment group within the picture; and 4) decoding at least one sample value for the first segment group and assigning the at least one sample value to a location in the decoded picture given by the first spatial location.

In some embodiments, the address mapping includes one or more of an array and/or list, a parallel set of arrays and/or lists, a hash map, and an associative array. In embodiments, decoding the first part of the bitstream to form the address mapping comprises: decoding from the bitstream a first value indicating a number of list values; and forming a list by decoding from the bitstream a number of list values, the number of list values being equal to the first value. In embodiments, determining the first segment group address for the first segment group based on the first segment group index value and the address mapping comprises performing a lookup operation using the first segment group index value.

In some embodiments, decoding the first part of the bitstream to form the address mapping comprises: decoding from the bitstream a first value indicating a number of list values; and forming a first list (KEY) and a second list (VALUE) by decoding from the bitstream a number of values representing key-value pairs k and v, the number of key-value pairs being equal to the first value. The first list includes the keys k and the second list includes the values v of the key-value pairs, and an ordering of the first list and the second list is such that for a given key-value pair, an index for the given key k in the first list corresponds to an index for the given value v in the second list. In embodiments, decoding the first part of the bitstream to form the address mapping includes: decoding from the bitstream a first value indicating a number of hash values; and forming a hash map by decoding from the bitstream a number of values representing key-value pairs k and v, the number of key-value pairs being equal to the first value, wherein for a given key-value pair, an index for the given key k is mapped by the hash map to a given value v.

In some embodiments, determining the first segment group address for the first segment group based on the first segment group index value and the address mapping comprises: determining an index (i) such that the value corresponding to the index in the first list (KEYM) matches the first segment group index value; and determining the first segment group address to be the value corresponding to the index in the second list (VALUE[i]). In some embodiments, determining the first segment group address for the first segment group based on the first segment group index value and the address mapping comprises performing a hash lookup operation using the first segment group index value. In some embodiments, the values representing key-value pairs k and v that are decoded comprise a delta value representing the key k, such that for the first key-value pair the key k is determined by the delta value and for other key-value pairs the key k is determined by adding the delta value to a previously determined key value to generate the current key k.

In some embodiments, segment groups correspond to tile groups, subpictures, and/or slices. In some embodiments, a segment group comprises one or more segments, and in some embodiments, a segment group comprises only one segment.

In embodiments, segment groups correspond to tile groups. In embodiments, the first part of the bitstream is comprised in a parameter set, and the method further comprises decoding additional segment groups, wherein the address mapping is used for decoding the additional segment groups. In embodiments, the first part of the bitstream is comprised in a parameter set, and the method further comprises decoding additional pictures, wherein the address mapping is used for decoding the additional pictures.

According to a second aspect, a method is provided for decoding a picture from a bitstream, the picture being partitioned into a plurality of segment groups. The method includes decoding a first part of the bitstream to form a size mapping that maps a segment group index value to a number of segments to be decoded for the first segment group; and decoding a second part of the bitstream. The second part of the bitstream comprises code words representing the plurality of segment groups. Decoding the second part of the bitstream comprises decoding a first segment group. Decoding the first segment group comprises: 1) decoding a first segment group index value for the first segment group; 2) determining a first size for the first segment group based on the first segment group index value and the size mapping; and 3) decoding a number of segments to form the decoded picture, the number of segments being equal to the first size.

In some embodiments, the size mapping includes one or more of an array and/or list, a parallel set of arrays and/or lists, a hash map, and an associative array. In embodiments, decoding the first part of the bitstream to form the size mapping comprises: decoding from the bitstream a first value indicating a number of list values; and forming a list by decoding from the bitstream a number of list values, the number of list values being equal to the first value. In embodiments, determining the first size for the first segment group based on the first segment group index value and the size mapping comprises performing a lookup operation using the first segment group index value.

In some embodiments, segment groups correspond to tile groups, subpictures, and/or slices. In some embodiments, a segment group comprises one or more segments, and in some embodiments, a segment group comprises only one segment.

According to a third aspect, a method is provided for encoding a picture into a bitstream, the picture being partitioned into a plurality of segment groups. The method includes determining an address mapping that maps a segment group index value to a segment group address for the plurality of segment groups; encoding a first part of the bitstream; and encoding a second part of the bitstream. Encoding the first part of the bitstream comprises generating code words forming the address mapping that maps a segment group index value to a segment group address. Encoding the second part of the bitstream comprises generating code words representing the plurality of segment groups. Encoding the second part of the bitstream comprises encoding a first segment group. Encoding the first segment group comprises: 1) determining a first segment group index value from a first segment group address for the first segment group, wherein the address mapping maps the first segment group index value to the first segment group address; 2) encoding the first segment group index value for the first segment group; and 3) encoding sample values for the first segment group.

According to a fourth aspect, a method is provided for encoding a picture into a bitstream, the picture being partitioned into a plurality of segment groups. The method includes determining a size mapping that maps a segment group index value to a number of segments to be encoded for a first segment group; encoding a first part of the bitstream; and encoding a second part of the bitstream. Encoding the first part of the bitstream comprises generating code words forming the size mapping that maps a segment group index value to a number of segments to be encoded for the first segment group. Encoding the second part of the bitstream comprises generating code words representing the plurality of segment groups. Encoding the second part of the bitstream comprises encoding a first segment group. Encoding the first segment group comprises: 1) determining a first segment group index value for the first segment group, wherein the size mapping maps the first segment group index value for the first segment group to a first size, the first size being a number of segments to be encoded for the first segment group; 2) encoding the first segment group index value for the first segment group; and 3) encoding a number of segments for the first segment group, the number of segments being equal to the first size.

In some embodiments, encoding the first segment group index value comprises generating one or more code words representing the first segment group index value.

According to a fifth aspect, a decoder is adapted to perform any one of the embodiments of the first or second aspects.

According to a sixth aspect, an encoder is adapted to perform any one of the embodiments of the third or fourth aspects.

In some embodiments, the encoder and decoder may be co-located in a same node, or they may be separate from each other. In embodiments, the encoder and/or decoder is part of a network node; in embodiments, the encoder and/or decoder is part of a user equipment.

According to a seventh aspect, a decoder is provided for decoding a picture from a bitstream, the picture being partitioned into a plurality of segment groups. The decoder includes a decoding unit and a determining unit. The decoding unit is configured to decode a first part of the bitstream to form an address mapping that maps a segment group index value to a segment group address; and is further configured to decode a second part of the bitstream. The second part of the bitstream comprises code words representing the plurality of segment groups. Decoding the second part of the bitstream comprises decoding a first segment group. Decoding the first segment group includes: 1) decoding (by the decoding unit) a first segment group index value for the first segment group; 2) determining (by the determining unit) a first segment group address for the first segment group based on the first segment group index value and the address mapping; 3) determining (by the determining unit) a first spatial location for the first segment group based on the first segment group address, the first spatial location representing a location of the first segment group within the picture; and 4) decoding (by the decoding unit) at least one sample value for the first segment group and assigning the at least one sample value to a location in the decoded picture given by the first spatial location.

According to an eighth aspect, a decoder is provided for decoding a picture from a bitstream, the picture being partitioned into a plurality of segment groups. The decoder includes a decoding unit and a determining unit. The decoding unit is configured to decode a first part of the bitstream to form a size mapping that maps a segment group index value to a number of segments to be decoded for the first segment group; and is further configured to decode a second part of the bitstream. The second part of the bitstream comprises code words representing the plurality of segment groups. Decoding the second part of the bitstream comprises decoding a first segment group. Decoding the first segment group comprises: 1) decoding (by the decoding unit) a first segment group index value for the first segment group; 2)

determining (by the determining unit) a first size for the first segment group based on the first segment group index value and the size mapping; and 3) decoding (by the decoding unit) a number of segments to form the decoded picture, the number of segments being equal to the first size.

According to a ninth aspect, an encoder is provided for encoding a picture from a bitstream, the picture being partitioned into a plurality of segment groups. The encoder includes an encoding unit and a determining unit. The determining unit is configured to determine an address mapping that maps a segment group index value to a segment group address for the plurality of segment groups. The encoding unit is configured to encode a first part of the bitstream; and is further configured to encode a second part of the bitstream. Encoding the first part of the bitstream comprises generating code words forming the address mapping that maps a segment group index value to a segment group address. Encoding the second part of the bitstream comprises generating code words representing the plurality of segment groups. Encoding the second part of the bitstream comprises encoding a first segment group. Encoding the first segment group comprises: 1) determining (by the determining unit) a first segment group index value from a first segment group address for the first segment group, wherein the address mapping maps the first segment group index value to the first segment group address; 2) encoding (by the encoding unit) the first segment group index value for the first segment group; and 3) encoding (by the encoding unit) sample values for the first segment group.

According to a tenth aspect, an encoder is provided for encoding a picture into a bitstream, the picture being partitioned into a plurality of segment groups. The encoder includes an encoding unit and a determining unit. The determining unit is configured to determine a size mapping that maps a segment group index value to a number of segments to be encoded for a first segment group. The encoding unit is configured to encode a first part of the bitstream; and is further configured to encode a second part of the bitstream. Encoding the first part of the bitstream comprises generating code words forming the size mapping that maps a segment group index value to a number of segments to be encoded for the first segment group. Encoding the second part of the bitstream comprises generating code words representing the plurality of segment groups. Encoding the second part of the bitstream comprises encoding a first segment group. Encoding the first segment group comprises: 1) determining (by the determining unit) a first segment group index value for the first segment group, wherein the size mapping maps the first segment group index value for the first segment group to a first size, the first size being a number of segments to be encoded for the first segment group; 2) encoding (by the encoding unit) the first segment group index value for the first segment group; and 3) encoding (by the encoding unit) a number of segments for the first segment group, the number of segments being equal to the first size.

According to an eleventh aspect, a computer program comprising instructions which when executed by processing circuitry of a node causes the node to perform the method of any one of the first, second, third, and fourth aspects is provided.

According to a twelfth aspect, a carrier containing the computer program of any embodiment of the eleventh aspect is provided, where the carrier is one of an electronic signal, an optical signal, a radio signal, and a computer readable storage medium.

BRIEF DESCRIPTION OF THE DRAWINGS

The accompanying drawings, which are incorporated herein and form part of the specification, illustrate various embodiments.

DETAILED DESCRIPTION

Figure 6:
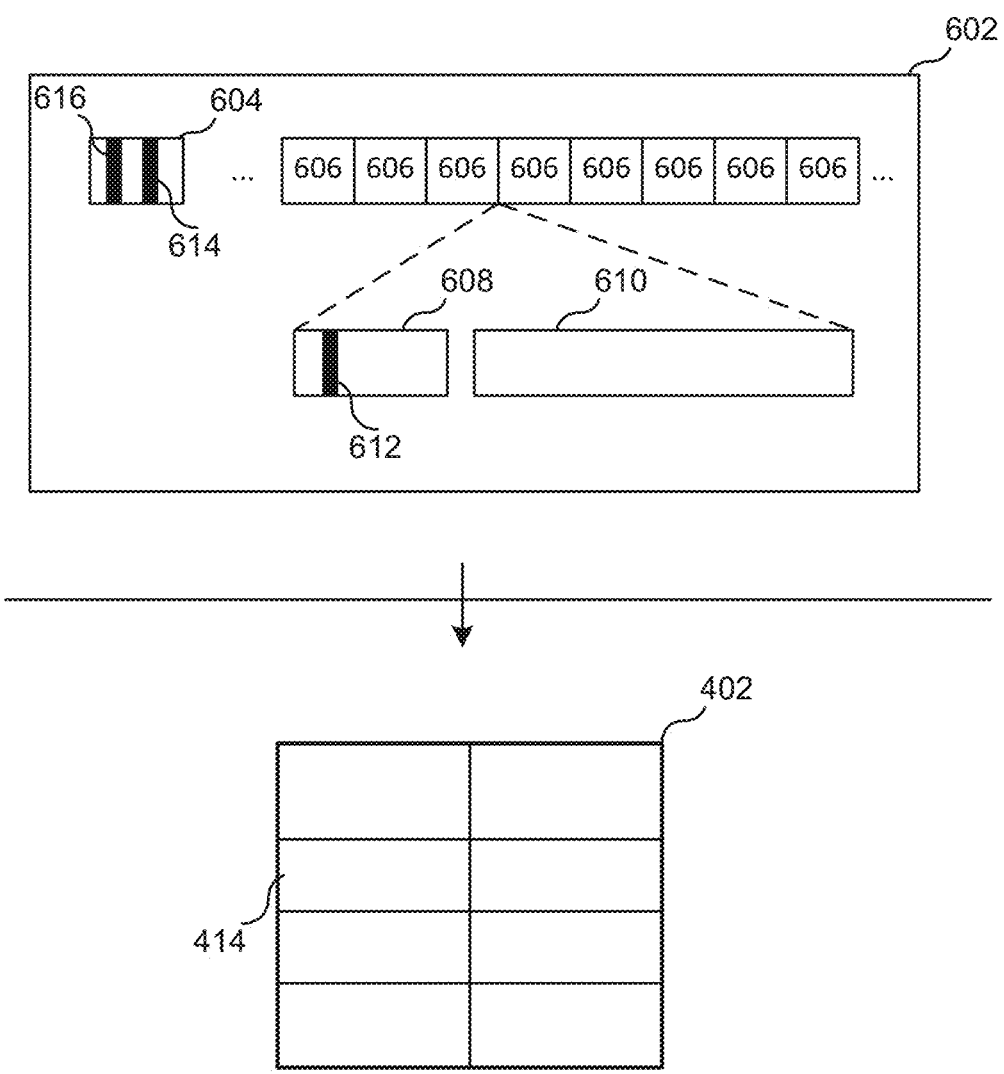
FIG. 6 illustrates an example of decoding an encoded bitstream, according to an embodiment.

FIG. 6 shows a bitstream 602 and the corresponding decoded picture 402 that results from decoding the bitstream 602. The bitstream 602 in this example includes a parameter set 604 and eight coded segment groups 606 that each correspond to a segment group 414 in the decoded picture 402. That is, when decoded the coded segment groups 606 result in segment group 414 in the decoded picture 402. A typical bitstream contains more than one picture, but for the sake of illustration the figure shows only one picture.

Figure 4:
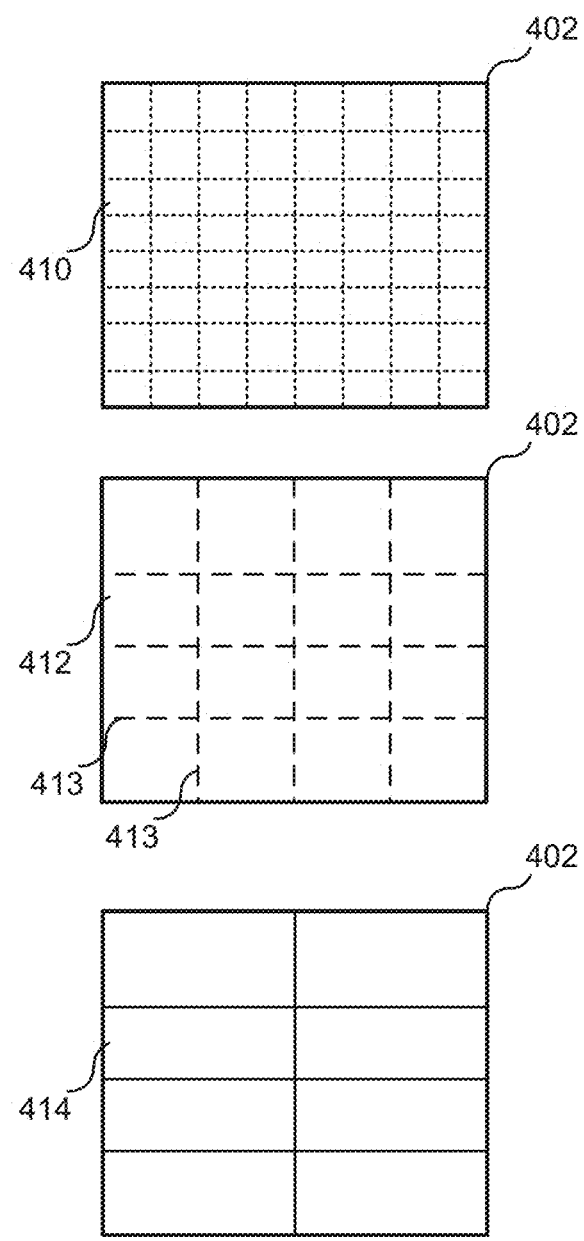
FIG. 4 illustrates an example of partitioning a picture, according to an embodiment.
Figure 5:
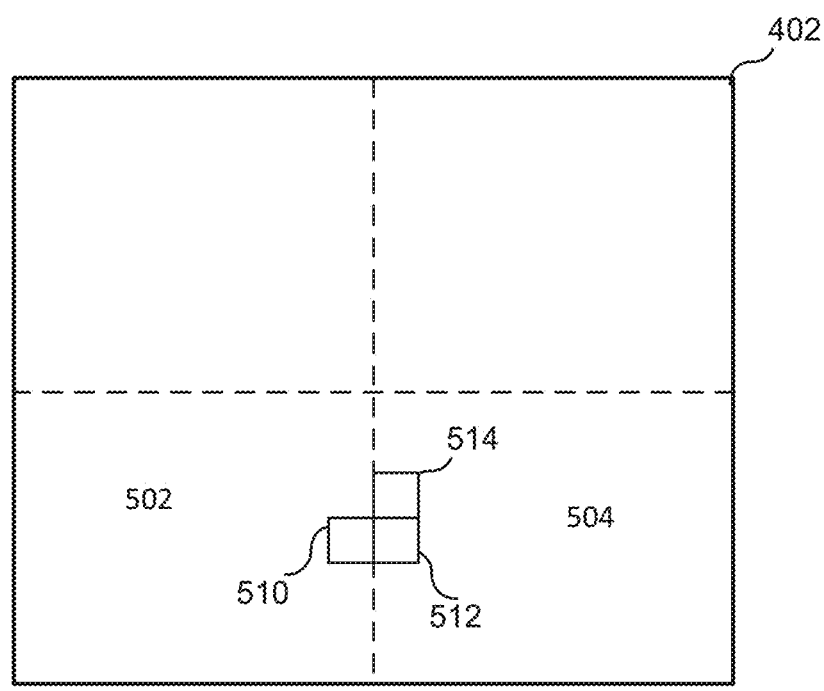
FIG. 5 illustrates an example of partitioning a picture, according to an embodiment.

The parameter set 604 includes syntax elements 616 that are decoded by a decoder as a list of segment group address values. The list may be implemented as an array of segment group address values. In this description, the terms array and list may be used interchangeably. The parameter set 604 also contains syntax elements 614 that are decoded by the decoder into a partition structure (e.g. partition structure 413 as shown in FIG. 4) that specifies how the picture 402 is partitioned into segments (e.g. segments 412 as shown in FIG. 4). This information (614 and 616) may, in some embodiments, be part of the same parameter set (as shown in FIG. 6), may be part of different parameter sets, or may be encoded in some other way. For example, one of the syntax elements 614 and 616 may be part of a sequence parameter set and the other may be part of a picture parameter set. The syntax elements 614 and 616 may also be placed anywhere in the bitstream or even conveyed out-of-band. In embodiments, it is important that none of syntax elements 614 and 616 is put in the coded segment groups

606, e.g. so that the information may be modified without having to modify the individual coded segment groups 606.

Each coded segment group 606 includes a segment group header 608 and segment group data 608. The segment group data 608 includes coded bits that are decoded into sample values for the segments that belong to the segment group. In embodiments herein described, the segment group header 608 includes one or more code words 612 that are decoded by the decoder into an index value i. The index value i is used as an index in the list of segment group address values to derive a segment group address for the segment group. The decoder uses the segment group address to determine the spatial location in the picture for the first segment in the segment group.

Figure 1:
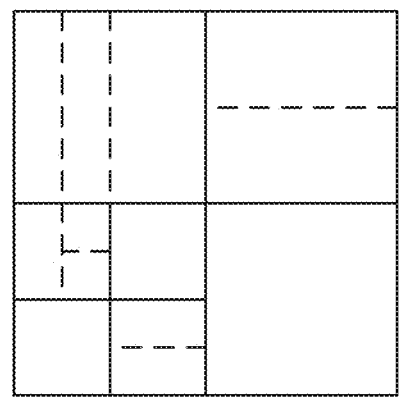
FIG. 1 illustrates a quadtree-plus-binary-tree-plus-ternary-tree block structure, according to related art.
Figure 1:
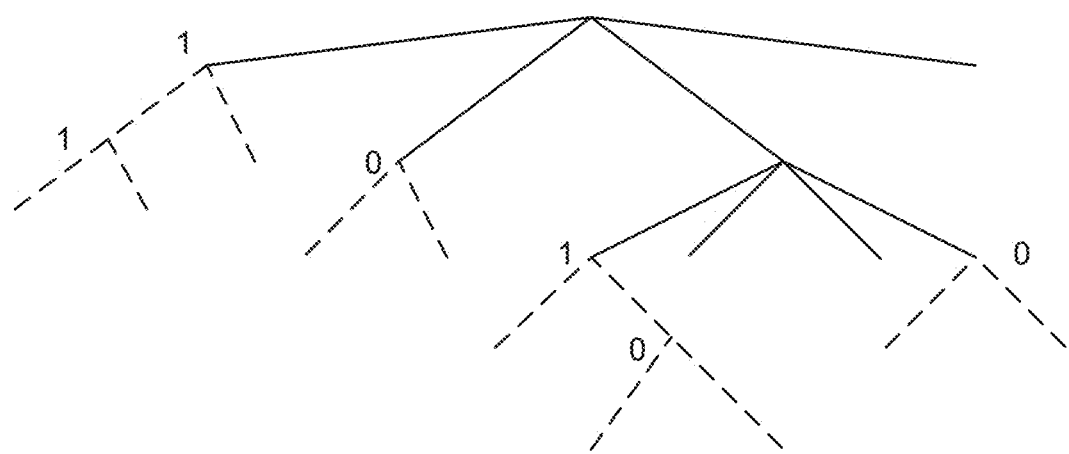
Figure 2:
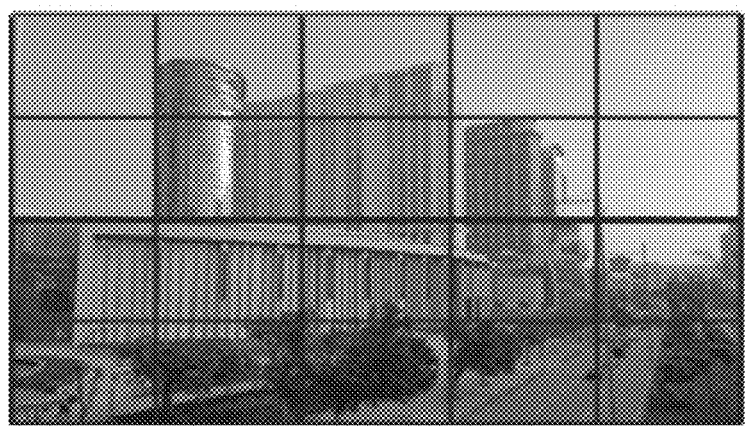
FIG. 2 illustrates an example of a tile partitioning using 4 tile rows and 5 tile columns labeled in raster scan order, according to related art.
Figure 3:
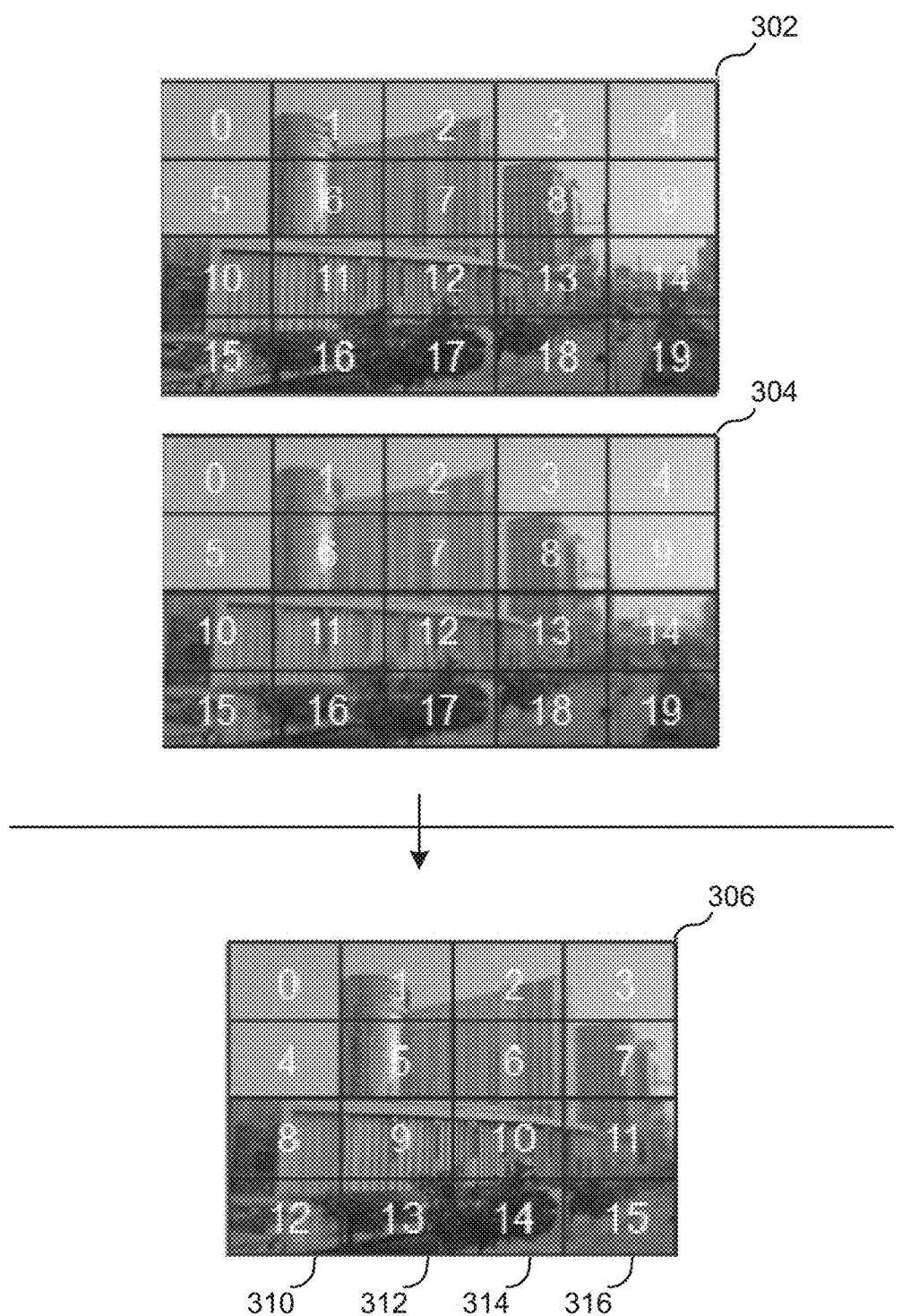
FIG. 3 illustrates an example of stitching a high-quality stream and low-quality stream into a single output stream.

By using a list of segment group address values in the parameter set and an index to that list in the segment group header, stitching of segment groups can be done without modifying the segment group header. This is because the segment group address values become decoupled from the coded segment group data by a layer of indirection. Using the example in FIG. 3 (as described above), Table 5 below shows how the mapping between indices and segment group address values may look like. The middle column in Table 5 shows an example mapping between indices and segment group addresses when encoding the video into high-quality and low-quality. This mapping is written into the parameter sets 604 during the original encodings using the syntax elements 616 conveying a list of segment group address values. The rightmost column in Table 5 shows how the mapping between indices and segment group address values may look like in the output bitstream after stitching. The indices written into the segment groups during encoding can be kept as-is, and stitching can be done by writing a new parameter set 604 that includes the mapping shown in the rightmost column using the syntax elements 616 conveying a list of segment group address values. Then, stitching of coded segment groups 606 can be done by copying or forwarding unmodified the tile_group_layer_rbsp( ) chunks.

TABLE 5

Example mappings between indices and segment group addresses

| Index | Segment group address Original encoding | Segment group address After stitching |
|---|---|---|
| 0 | 0 | 0 |
| 1 | 1 | 1 |
| 2 | 2 | 2 |
| 3 | 3 | 3 |
| 4 | 4 | 5 |
| 5 | 5 | 6 |
| 6 | 6 | 7 |
| 7 | 7 | 8 |
| 8 | 8 | 10 |
| 9 | 9 | 11 |
| 10 | 10 | 12 |
| 11 | 11 | 13 |
| 12 | 12 | 15 |
| 13 | 13 | 16 |
| 14 | 14 | 17 |
| 15 | 15 | 18 |
| 16 | 16 | |
| 17 | 17 | |
| 18 | 18 | |
| 19 | 19 | |

As described here, it is the segment groups that have addresses. In some embodiments, addresses may alternatively or additionally be signaled for each segment, instead of just for each segment group.

Figure 7:
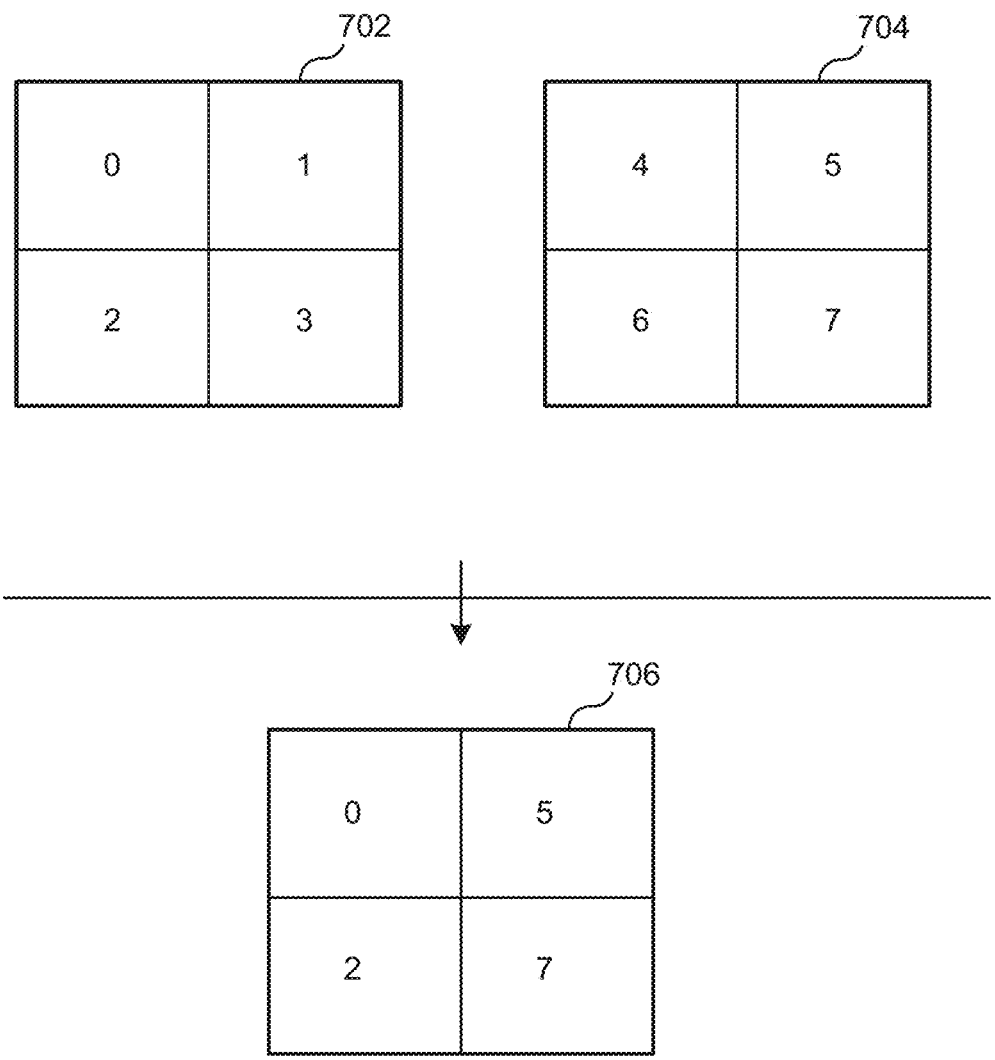
FIG. 7 illustrates an example of stitching two input streams into a single output stream, according to an embodiment

According to some embodiments, it is possible to stitch segment groups from two or more pictures into one picture without rewriting the Video Coding Layer (VCL) NAL unit data. This is shown in FIG. 7, where each segment group of the original pictures 702 and 704 has a unique index mapping to the segment group address value in the parameter set. When stitching the segment groups into a new picture 706, the indices in the segment groups are preserved but are mapped to the new segment group addresses in the parameter set.

Several examples are now described.

A first example follows. The first example involves using a single list for the segment group addresses stored in the parameter set. In this embodiment, the segment group address values are stored in the parameter set as a single list, that we refer to here as LIST. The syntax elements 616 are in this case a coded representation of LIST and may consist of code words that are decoded into a number N that specifies how many entries there are in LIST, i.e. the length of LIST. The syntax elements 616 additionally consist of one or more code words per entry that are decoded into N numbers that specify segment group address values. For example, LIST may be encoded in the bitstream as a sequential array of segment group address values.

The following pseudo-code shows how LIST may be decoded and constructed from the bitstream:

```
n = decode_n_value_from_bitstream( );
for(i=0 ; i<n ; i++) {
    LIST[i] = decode_value_from_bitstream( );
}
```

The functions decode_n_value_from_bitstream ( ) and decode_value_from_bitstream( ) reads the next code word or multiple code words from the bitstream and returns a value. The code word may be a fixed-length code word, a variable length code word, an entropy-encoded code word or any other type of code word. A code word may also be referred to as syntax element.

Then, after decoding the LIST of segment group address values from the parameter set, the segment groups may be decoded. In each segment group header, there is one or more code words 612 that are decoded by the decoder into an index value i. The index value i is used as an index into LIST to derive a segment group address value for the segment group, such as the address becomes equal to LIST[i].

To implement the example above, where segment group address values are stored in a list, and segment group headers contain an index into that list, an encoder can encode the segment group address values as part of encoding the picture parameter set. For example, the list can be encoded by first encoding a size of the list followed by encoding sequentially each of the address values of the list. Further, when encoding the segment group data, the encoder can encode an index into the address value list into the segment group header where the address value represented by the index corresponds to the spatial location of the segment group within the picture. Encoding the list size and/or encoding the address values can include encoding one or more code words into the bitstream; for example, the encoder may use fixed width encoding, variable width encoding, entropy-based encoding, and so on. Likewise, decoding the list size and/or decoding the address values can include decoding one or more code words from the bitstream.

When decoding a bitstream that has been encoded in the manner just described, the decoder can decode the segment group address value list. For example, the decoder can decode the size of the list from the bitstream, and then decode each of the address values representing the list. As part of decoding the list, the decoder can store the address values in a list or array data structure (for example), e.g. as represented by LIST[e]=value, where e ranges from 0 to one less than the size of the list that was decoded, and value is the corresponding address value that was decoded. The address values may be stored in a list such that the e-th decoded address value is stored as the e-th entry in the list (though other representations are possible, based on how the list has been encoded). The decoder may then decode the segment group data for each of the segment groups in the picture. When decoding a current segment group, the decoder may decode a segment group header corresponding to the current segment group. Decoding the segment group header may include decoding an index value i from the bitstream (e.g. from one or more code words), where the index value i represents an index into the segment group address value list. Once the index value i is decoded, the decoder can derive an address value for the current segment group by setting the address value for the segment group to the address value for the i-th entry in the list. For example, the decoder may perform a lookup operation to determine this value. The decoder may also use the address value to determine a spatial location in the picture being decoded for the current segment group. This may include determining a spatial location in the picture being decoded for a first segment in the current segment group. The decoder may then use the determined spatial location when decoding segment data for the current segment group into decoded sample values. For example, the spatial location may be used by the decoder to store the decoded sample values in the correct location in the decoded picture.

Table 6 and Table 7 below show example syntax for the above-described example, followed by example semantics. The syntax and semantics are intended to be seen as modifications to the current VVC draft specification. The current VVC draft specification is provided in the JVET-L0686-v2-SpecText.docx JVET input contribution. However, use of the VVC standard is not necessary for applying the above-described example, and reference to it is for illustrative purposes.

TABLE 6

Parameter set syntax and semantics for first example

| | Descriptor |
|---|---|
| parameter_set_rbsp( ) { | |
| ... | |
| num_tile_group_addresses_minus1 | ue(v) |
| for( i = 0; i < num_tile_group_addresses_minus1+1; i++ ) | |
| { | |
| pps_tile_group_address[ i ] | u(v) |
| } | |
| ... | |
| } | | num_tile_group_addresses_minus1 plus 1 specifies the number of tile group addresses associated with the PPS. The value of num_tile_group_addresses_minus1 shall be in the range of 0 to maxNbrOfTileGroupAddresses, inclusive. [Ed note: maxNbrOfTileGroupAddresses may for instance be set to 2046 as an example number.]

pps_tile_group_address[i] is used to specify the i-th tile group address associated with the PPS.

The length of pps_tile_group_address[i] is Ceil(Log 2 (NumTilesInPic)) bits, where Ceil refers to the ceiling operator. [Ed note: NumTilesInPic is a variable denoting the number of tiles in the picture. This number is derived from other code words in a parameter set.]

The value of pps_tile_group_address[i] shall be in the range of 0 to NumTilesInPic−1, inclusive.

It is a requirement of bitstream conformance that the value of pps_tile_group_address[i] shall not be equal to the value of pps_tile_group_address[j] for any value of j not equal to i.

TABLE 7

Tile group header syntax and semantics for first example

| | Descriptor |
|---|---|
| tile_group_header( ) { | |
| ... | |
| tile_group_address_idc | ue(v) |
| num_tiles_in_tile_group_minus1 | ue(v) |
| ... | |
| } | | tile_group_address_idc is used to specify the tile address of the first tile in the tile group.

The value of tile_group_address_idc shall be in the range of 0 to num_tile_group_addresses_minus1, inclusive.

The variable TileGroupAddress is set equal to pps_tile_group_address[tile_group_address_idc].

The value of TileGroupAddress shall be in the range of 0 to NumTilesInPic−1, inclusive.

The value of TileGroupAddress shall not be equal to the value of TileGroupAddress of any other coded tile group NAL unit of the same coded picture.

num_tiles_in_tile_group_minus1 plus 1 specifies the number of tiles in the tile group. The value of num_tiles_in_tile_group_minus1 shall be in the range of 0 to NumTilesInPic−1, inclusive. [Ed note: This description exists in the current VVC draft specification.]

In alternative versions of the first example, the restriction of the maximum value for pps_tile_group_address[i] is defined in a different way; for instance, using a fixed maximum value, such as a multiple of NumTilesInPic, or being signaled in the bitstream. In an alternative version, the pps_tile_group_address[i] code word is signaled by a variable length code word instead of a fixed length code word. The variable length code word may be a Universal Variable Length Code (UVLC) code word.

Similarly, in alternative versions of the first example, the restriction of the maximum value for num_tile_group_addresses_minus_1 is defined in a different way; for instance, using a fixed maximum value, as a multiple of NumTilesInPic, or being signaled in the bitstream.

A second example follows. The second example involves using a dictionary for the segment group addresses stored in the parameter set. In this embodiment, the segment group address values are stored in the parameter set as a dictionary. The dictionary may be implemented by a suitable data structure, e.g. a hash map or an associative array.

In one version of this example, the dictionary may be encoded as a single list where each entry in the single list consists of a pair of values where the first element in the pair is a dictionary key value and the second element in the pair is a dictionary value (a.k.a. a key-value pair). In another version, two lists are used, the first list being a list of keys and the second list being a list of values. The two lists may be referred to as a parallel set of lists since they are parallel in the sense that the i-th entry in one list is associated with the i-th entry of the other list. The two lists may be implemented as two arrays or a parallel set of arrays. Other encodings and representations of a dictionary are possible. The variation using two lists is described here for illustrative purposes. One advantage to this example over the example using a single list is that when stitching together multiple streams, this example can avoid having (potentially numerous) empty slots, that is, list values that are not used in the final output stream.

The syntax elements 616, in this example, are a coded representation of two lists, here called KEY and VALUE. In some embodiments, the lists are the same size, and so a single code word representing the size is sufficient. The syntax elements 616 therefore may consist of the list size followed by the values for the KEY and VALUE lists. Each value may be encoded as one or more code words, using fixed length, variable length, entropy coding, or other coding techniques. In an embodiment, the decoded code words for the VALUE or KEY lists are put into those lists in the order they are decoded, e.g. such that the second decoded value for KEY is put as the second element in KEY. In some embodiments, the values for the KEY list are encoded sequentially before the sequentially encoded values for the VALUE lists; in other embodiments the order is reversed, and in other embodiments the corresponding elements of the KEY and VALUE lists are encoded together.

Examples of decoding a dictionary are provided below. Encoding the dictionary into the bitstream is similar, and essentially the inverse operation of decoding. As with the first example above, encoding and decoding of the segment group address value information may occur separately (e.g. before) encoding and decoding of the segment group data representing the sample values for the segments comprising the segment group.

To implement this example, first the decoder may decode the address value information. Two variations are presented below.

For the variant where all values put in KEY are decoded before any values put in VALUE, the following pseudo-code describes how the decoder may function:

```
n = decode_n_value_from_bitstream( );
for(i = 0 ; i<n ; i++)
    KEY[i] = decode_key_value_from_bitstream( );
for(i=0 ; i<n ; i++)
    VALUE[i] = decode_value_from_bitstream( );
```

In another variant, the values put in KEY and VALUE are interleaved as shown in the following pseudo-code:

```
n = decode_n_value_from_bitstream( );
for(i = 0 ; i<n ; i++) {
    KEY[i] = decode_key_value_from_bitstream( );
    VALUE[i] = decode_value_from_bitstream( );
}
```

The functions decode_n_value_from_bitstream( ), decode_key_value_from_bitstream( ), and decode_value_from_bitstream( ) each reads the next code word or multiple code words from the bitstream and returns a value. The code word may be a fixed-length code word, a variable length code word, an entropy-encoded code word or any other type of code word.

Once the address value information has been decoded, the decoder may then decode the segment group data for each of the segment groups in the picture. When decoding a current segment group, the decoder may decode a segment group header corresponding to the current segment group. Decoding the segment group header may include decoding an index value i from the bitstream (e.g. from one or more code words), where the index value i represents an index into the KEY list which contains a further index into the VALUE list. Once the index value i is decoded, the decoder can derive an address value for the current segment group by determining the position pos in list KEY for which the list value KEY[pos] matches the index value i, and then determining that the segment group address value is VALUE[pos].

The operation of retrieving a value associated with a key value by providing the key value is called a lookup operation using the key value. In this embodiment, the lookup operation, for example by using KEY[k] as the key value, can be implemented using any appropriate method, e.g. by employing a hash function or otherwise.

Figure 8:
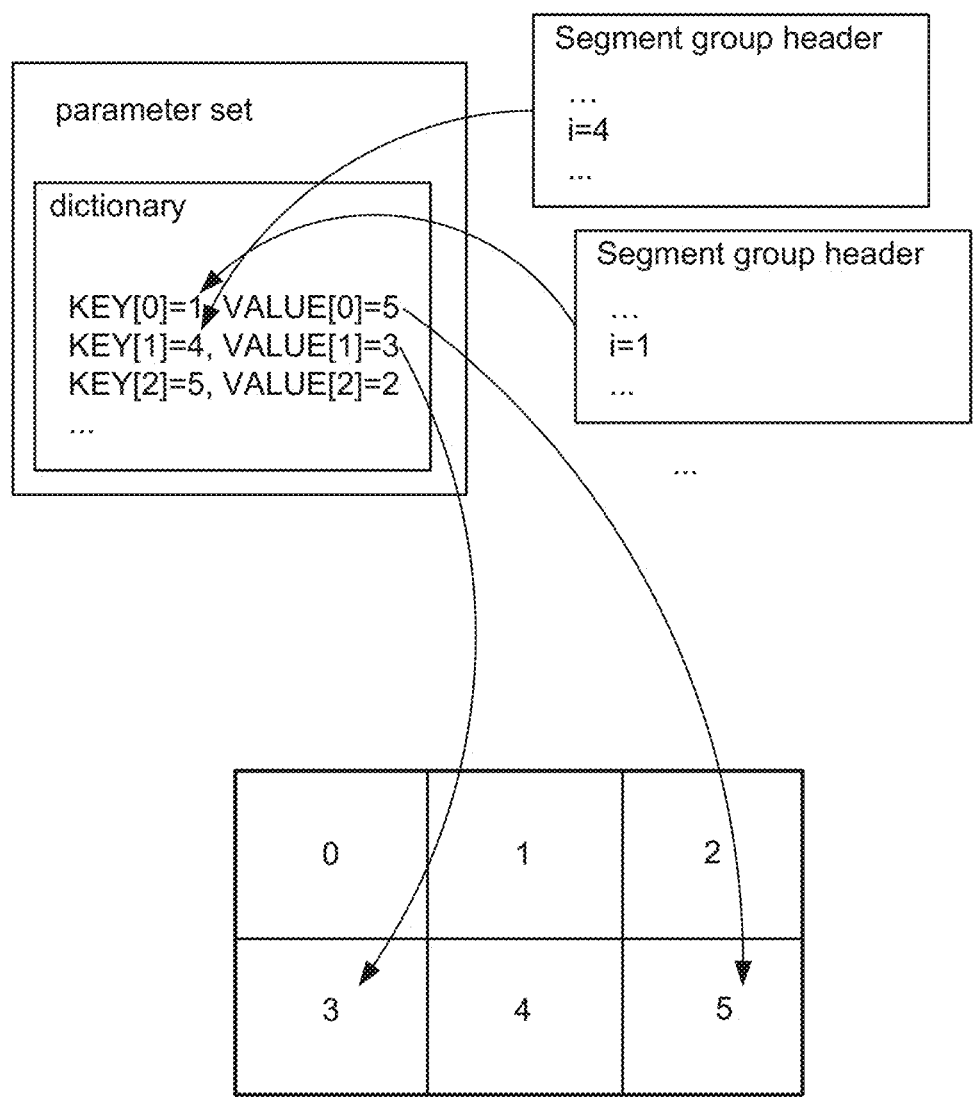
FIG. 8 illustrates an example of an address mapping that maps a segment group index to a segment group address, according to an embodiment.

The derivation of the segment group address from the index i in this example is illustrated in FIG. 8. FIG. 8 shows a parameter set including a dictionary having KEY and VALUE lists. FIG. 8 also shows two segment group headers, one having an index i=4 and another having an index i=1. As shown, index i=4 is decoded from a first segment group header. The value 4 is found in the dictionary in the parameter set, KEY[1], corresponding to VALUE[1]=3, which is used to determine the segment group address of the first segment group (which is 3 here). In the second segment group, an index i=1 is decoded, where 1 is found for KEY[0] in the dictionary. The corresponding VALUE[0]=5 is therefore used to determine the segment group address of the second segment group (which is here 5). This is illustrated in FIG. 8 by arrows from the segment group header to the corresponding KEY entry, and then arrows from the corresponding KEY entry to the corresponding segment group address in the decoded picture.

Alternatively, as the KEY and VALUE lists are being decoded, a hash map MAP could be populated, such that for each key k in KEY having position pos in the list KEY, MAP{k}=v, where v=VALUE[pos]. Using this hash map, determining the segment group address from the index i can be accomplished by performing a hash map lookup operation such as MAP{i}. The advantage of this data structure is that it may avoid a linear search of the KEY list when determining segment group addresses during decoding of segment group data.

As in this first example, the decoder may use the segment group address to determine a spatial location when decoding segment data into decoded samples.

Table 8 and Table 9 show example syntax for this example followed by example semantics. The syntax and semantics are intended to be seen as modifications to the current VVC draft specification. The current VVC draft specification is provided in the JVET-L0686-v2-SpecText.docx JVET input contribution. However, use of the VVC standard is not necessary for applying the above-described example, and reference to it is for illustrative purposes.

TABLE 8

Parameter set syntax and semantics for second example

| | Descriptor |
|---|---|
| parameter_set_rbsp( ) { | |
| ... | |
|    num_tile_group_addresses_minus1 | ue(v) |
|    for( i = 0; i < num_tile_group_addresses_minus1+1; i++ ) | |
|    { | |
|       pps_tile_group_idc[ i ] | ue(v) |
|       pps_tile_group_address[ i ] | u(v) |
|    } | |
| ... | |
| } | | num_tile_group_addresses_minus1 plus 1 specifies the number of tile addresses associated with the PPS. The value of num_tile_group_addresses_minus1 shall be in the range of 0 to NumTilesInPic−1, inclusive.

pps_tile_group_idc[i] is used to specify the i-th tile group idc associated with the PPS.

pps_tile_group_idc shall be less than or equal to 8*NumTilesInPic.

It is a requirement of bitstream conformance that the value of pps_tile_group_idc[i] shall not be equal to the value of pps_tile_group_idc[j] for any value of j not equal to i.

pps_tile_group_address[i] is used to specify the i-th tile group address associated with the PPS.

The length of pps_tile_group_address[i] is Ceil(Log 2 (NumTilesInPic)) bits.

The value of pps_tile_group_address[i] shall be in the range of 0 to NumTilesInPic−1, inclusive.

It is a requirement of bitstream conformance that the value of pps_tile_group_address[i] shall not be equal to the value of pps_tile_group_address[j] for any value of j not equal to i.

TABLE 9

Tile group header syntax and semantics for second example

| | Descriptor |
|---|---|
| tile_group_header( ) { | |
| ... | |
|    tile_group_address_idc | ue(v) |
|    num_tiles_in_tile_group_minus1 | ue(v) |
| ... | |
| } | | tile_group_address_idc is used to specify the tile address of the first tile in the tile group.

The variable TileGroupAddress is set equal to pps_tile_group_address[i] where i is the value for which pps_tile_group_idc[i] is equal to tile_group_address_idc It is a requirement of bitstream conformance that there is a value i in the range of 0 to num_tile_group_addresses_minus1, inclusive, for which pps_tile_group_address[i] is equal to tile_group_address_idc.

It is a requirement of bitstream conformance that the value of TileGroupAddress shall not be equal to the value of TileGroupAddress of any other coded tile group NAL unit of the same coded picture.

num_tiles_in_tile_group_minus1 plus 1 specifies the number of tiles in the tile group. The value of num_tiles_in_tile_group_minus1 shall be in the range of 0 to NumTilesInPic−1, inclusive. [Ed note: This description exist in the current VVC draft specification.]

In alternative versions of this example, the restriction of the maximum value for pps_tile_group_adress[i] is defined in a different way; for instance, using a fixed maximum value, as a multiple of NumTilesInPic, or being signaled in the bitstream. In an alternative version, the pps_tile_group_address[i] code word is signaled by a variable length code word instead of a fixed length code word. The variable length code word may be a UVLC code word.

Similarly, in alternative versions of this example, the restriction of the maximum value for num_tile_group_addresses_minus_1 is defined in a different way; for instance, using a fixed maximum value, as a multiple of NumTilesInPic, or being signaled in the bitstream.

A third example follows. The third example is similar to the second example, and involves using a dictionary for the segment group addresses stored in the parameter set, where the dictionary is encoded and decoded using delta signaling.

In this example, the dictionary key values are encoded and decoded as delta values into or from the bitstream. For example, the decoding of lists KEY and VALUE can be described by the following pseudo-code:

```
n = decode_n_value_from_bitstream( );
for(i = 0 ; i<n ; i++) {
    delta_key = decode_key_value_from_bitstream( );
    if(i==0)
        KEY[i] = delta_key;
    else
        KEY[i] = KEY[i-1] + delta_key + 1;
    VALUE[i] = decode_value_from_bitstream( );
}
```

As in the second example above, the values may be decoded in any order and may not be limited to the order described in the pseudo-code above. In embodiments, the number of values to decode is 2*n (one value for KEY and a corresponding value for VALUE), and the order in which to decode the values is static so that an encoder can convey the two lists KEY and VALUE correctly without ambiguities.

One advantage of this example over the second example above is that it saves bits since it is in general less expensive in terms of bits to signal a delta value compared to an absolute value. Another advantage is when the delta value is restricted to be greater than or equal to 1; in that case, each dictionary key value will by definition be uniquely specified.

Table 10 and Table 11 show example syntax for this embodiment followed by example semantics. As previously noted, use of the VVC standard is not necessary for applying the above-described example, and reference to it is for illustrative purposes.

TABLE 10

Parameter set syntax and semantics for third example

| | Descriptor |
|---|---|
| parameter_set_rbsp( ) { | |
| ... | |
|    num_tile_group_addresses_minus1 | ue(v) |
|    for( i = 0; i < num_tile_group_addresses_minus1+1; i++ ) | |
|    { | |
|       pps_tile_group_idc_delta_minus1[ i ] | ue(v) |
|       pps_tile_group_address[ i ] | u(v) |
|    } | |
| ... | |
| } | | num_tile_group_addresses_minus1 plus 1 specifies the number of tile addresses associated with the PPS. The value of num_tile_group_addresses_minus1 shall be in the range of 0 to NumTilesInPic−1, inclusive.

pps_tile_group_idc_delta_minus1[i]plus 1 is used to specify the i-th tile group idc associated with the PPS.

The variable TileGroupAddressIdcPPS[i] is derived as follows:

1. TileGroupAddressIdcPPS[0] is set equal to pps_tile_group_idc_delta_minus1[0].
2. For values of i greater than 0, TileGroupAddressIdcPPS[i] is set equal to TileGroupAddressIdcPPS[i]−1+pps_tile_group_idc_delta_minus1[i]+1.

TileGroupAddressIdcPPS[num_tile_group_addresses_minus1] shall be less than or equal to 8*NumTilesInPic.

pps_tile_group_address[i] is used to specify the i-th tile group address associated with the PPS.

The length of pps_tile_group_address[i] is Ceil(Log 2 (NumTilesInPic)) bits.

The value of pps_tile_group_address[i] shall be in the range of 0 to NumTilesInPic−1, inclusive.

It is a requirement of bitstream conformance that the value of pps_tile_group_address[i] shall not be equal to the value of pps_tile_group_address[j] for any value of j not equal to i.

TABLE 11

Tile group header syntax and semantics for third example

| | Descriptor |
|---|---|
| tile_group_header( ) { | |
| ... | |
| tile_group_address_idc | ue(v) |
| num_tiles_in_tile_group_minus1 | ue(v) |
| ... | |
| } | | tile_group_address_idc is used to specify the tile address of the first tile in the tile group.

TileGroupAddress is set equal to pps_tile_address[i] where i is the value for which TileGroupAddressIdcPPS[i] is equal to tile_group_address_idc.

Alternatively, the variable TileGroupAddress is derived as follows:

1. If tile_group_address_idc is not present in the tile group header, the value of TileGroupAddress is set equal to 0.
2. Otherwise, TileGroupAddress is set equal to pps_tile_address[i] where i is the value for which TileGroupAddressIdcPPS[i] is equal to tile_group_address_idc.

It is a requirement of bitstream conformance that there is a value i in the range of 0 to num_tile_group_addresses_minus1, inclusive, for which TileGroupAddressIdcPPS[i] is equal to tile_group_address_idc.

It is a requirement of bitstream conformance that the value of TileGroupAddress shall not be equal to the value of TileGroupAddress of any other coded tile group NAL unit of the same coded picture.

num_tiles_in_tile_group_minus1 plus 1 specifies the number of tiles in the tile group. The value of num_tiles_in_tile_group_minus1 shall be in the range of 0 to NumTilesInPic−1, inclusive. [Ed note: This description exist in the current VVC draft specification.]

In an alternative version of this example, the first tile group index is not set using the pps_tile_group_idc_delta_minus1 [0] syntax element, but explicitly specified in its own syntax element. Table 12 shows example parameter set syntax followed by semantics for the alternative version.

TABLE 12

Parameter set syntax for alternative version of third example

| | Descriptor |
|---|---|
| parameter_set_rbsp( ) { | |
| ... | |
| num_tile_group_addresses_minus1 | ue(v) |
| if (num_tile_group_addresses_minus1 > 0) | |
| pps_first_tile_group_idc | ue(v) |
| for( i = 0; i < num_tile_group_addresses_minus1+2; i++ ) | |
| { | |
| pps_tile_group_idc_delta_minus1[ i ] | ue(v) |
| pps_tile_group_address[ i ] | u(v) |
| } | |
| ... | |
| } | | pps_first_tile_group_idc and pps_tile_group_idc_delta_minus1[i] plus 1 is used to specify the i-th tile group idc associated with the PPS.

The variable TileGroupAddressIdcPPS[i] is derived as follows:

1. TileGroupAddressIdcPPS[0] is set equal to pps_first_tile_group_idc.
2. For values of i greater than 0, TileGroupAddressIdcPPS[i] is set equal to TileGroupAddressIdcPPS[i−1]+pps_tile_group_idc_delta_minus1[i]+1.

TileGroupAddressIdcPPS[num_tile_group_addresses_minus1] shall be less than or equal to 2046.

In other alternative versions of the current example, the restriction of the maximum value for pps_tile_group_adress[i] is defined in a different way; for instance, using a fixed maximum value, as a multiple of NumTilesInPic, or being signaled in the bitstream.

Similarly, in other alternative versions of the current embodiment the restriction of the maximum value for num_tile_group_addresses_minus_1 is defined in a different way; for instance, using a fixed maximum value, as a multiple of NumTilesInPic, or being signaled in the bitstream.

In an alternative version, the pps_tile_group_address[i] code word is signaled by a variable length code word instead of a fixed length code word. The variable length code word may be a UVLC code word.

A fourth example follows. The fourth example involves using a list or dictionary or other layer of indirection for storing values other than segment group address values. The previous examples, for instance, enable relocation of tile groups in the bitstream. In order to facilitate extraction, stitching or relocation of tiles in the bitstream without modifying the tile group layer parts of the bitstream, we now introduce a mapping (e.g. in the PPS) between tile groups and the number of tiles in the tile group.

The mapping can be done similar to examples 1-3 above, e.g. by using a list, dictionary, or dictionary with delta signaling, to encode and decode the mapping. For example, according to example 1 above, the address value may be substituted for a value representing the number of tiles in the tile group. For illustration purposes, further detail below is provided using the dictionary similar to example 2.

In the current VVC draft specification, the number of tiles in the tile group is signaled using the num_tiles_in_tile_group_minus1 code word. This example does not require using that specific code word; any single or multiple code words that covey the number of tiles there are in the tile group would also be suitable. One example of an alternative signaling to using num_tiles_in_tile_group_minus1 is to use two code words that signals the height and width of the tile group in units of tiles. The number of tiles in the tile group is then the multiplication of the two values that are derived from those two code words.

Assuming that num_tiles_in_tile_group_minus1 is used, the following pseudo code can be used to decode the PPS dictionary:

```
n = decode_n_value_from_bitstream( );
for(i = 0 ; i<n ; i++) {
    KEY[i] = decode_key_value_from_bitstream( );
    ADDRESS[i] =
decode_address_value_from_bitstream( );
    SIZE[i] = decode_size_value_from_bitstream( );
}
```

The functions decode_n_value_from_bitstream( ), decode_key_value_from_bitstream( ), decode_address_value_from_bitstream( ) and decode_size_value_from_bitstream( ) each reads the next code word or multiple code words from the bitstream and returns a value. The code word may be a fixed-length code word, a variable length code word, an entropy-encoded code word or any other type of code word.

Then, in each segment group header, there is one or more code words 612 that are decoded by the decoder into an index value i. Then the position, k, in list KEY for which the list value KEY[k] is identical to the index value i, is determined. The address value is then set equal to ADDRESS[k] and the size value is set equal to SIZE[k].

Table 13 and Table 14 show example syntax for this embodiment followed by example semantics. The syntax and semantics is intended to be seen as modifications to the current VVC draft specification. The current VVC draft specification is provided in the JVET-L0686-v2-SpecText. docx JVET input contribution. However, use of the VVC standard is not necessary for applying the above-described example, and reference to it is for illustrative purposes.

TABLE 13

Parameter set syntax and semantics for fourth example

| | Descriptor |
|---|---|
| parameter_set_rbsp( ) { | |
| ... | |
|   num_tile_group_addresses_minus1 | ue(v) |
|   for( i = 0; i < num_tile_group_addresses_minus1+1; i++ ) | |
|   { | |
|     pps_tile_group_idc[ i ] | ue(v) |
|     pps_tile_group_address[ i ] | u(v) |
|     pps_tiles_in_tile_group_minus1[ i ] | ue(v) |
|   } | |
| ... | |
| } | | num_tile_group_addresses_minus1 plus 1 specifies the number of tile addresses associated with the PPS. The value of num_tile_group_addresses_minus1 shall be in the range of 0 to NumTilesInPic−1, inclusive.

pps_tile_group_idc[i] is used to specify the i-th tile group idc associated with the PPS.

pps_tile_group_idc shall be less than or equal to 8*NumTilesInPic.

It is a requirement of bitstream conformance that the value of pps_tile_group_idc[i] shall not be equal to the value of pps_tile_group_idc[j] for any value of j not equal to i.

pps_tile_group_address[i] is used to specify the i'th tile group address associated with the PPS.

The length of pps_tile_group_address[i] is Ceil(Log 2 (NumTilesInPic)) bits.

The value of pps_tile_group_address[i] shall be in the range of 0 to NumTilesInPic−1, inclusive.

It is a requirement of bitstream conformance that the value of pps_tile_group_address[i] shall not be equal to the value of pps_tile_group_address[j] for any value of j not equal to i.

pps_tiles_in_tile_group_minus1[i] plus 1 specifies the i-th number of tiles associated with the PPS. The value of num_tiles_in_tile_group_minus1[i] shall be in the range of 0 to NumTilesInPic−1, inclusive.

TABLE 14

Tile group header syntax and semantics for fourth example

| | Descriptor |
|---|---|
| tile_group_header( ) { | |
| ... | |
|   tile_group_address_idc | ue(v) |
| ... | |
| } | | tile_group_address_idc is used to specify the tile address of the first tile in the tile group as well as the number of tiles in the tile group.

The variable TileGroupAddress is set equal to pps_tile_group_address[i] where i is the value for which pps_tile_group_idc[i] is equal to tile_group_address_idc.

It is a requirement of bitstream conformance that there is a value i in the range of 0 to num_tile_group_addresses_minus1, inclusive, for which pps_tile_group_address[i] is equal to tile_group_address_idc.

It is a requirement of bitstream conformance that the value of TileGroupAddress shall not be equal to the value of TileGroupAddress of any other coded tile group NAL unit of the same coded picture.

The variable NumTilesInTileGroup is set equal to the value of pps_tiles_in_tile_group_minus1[i]+1 where i is the value for which pps_tile_group_idc[i] is equal to tile_group_address_idc.

Other potential values to signal in the dictionary includes byte or bit count for each tile group, byte or bit count for each tile in a tile group, height and width of each tile in a tile group, and so on.

Figure 9:
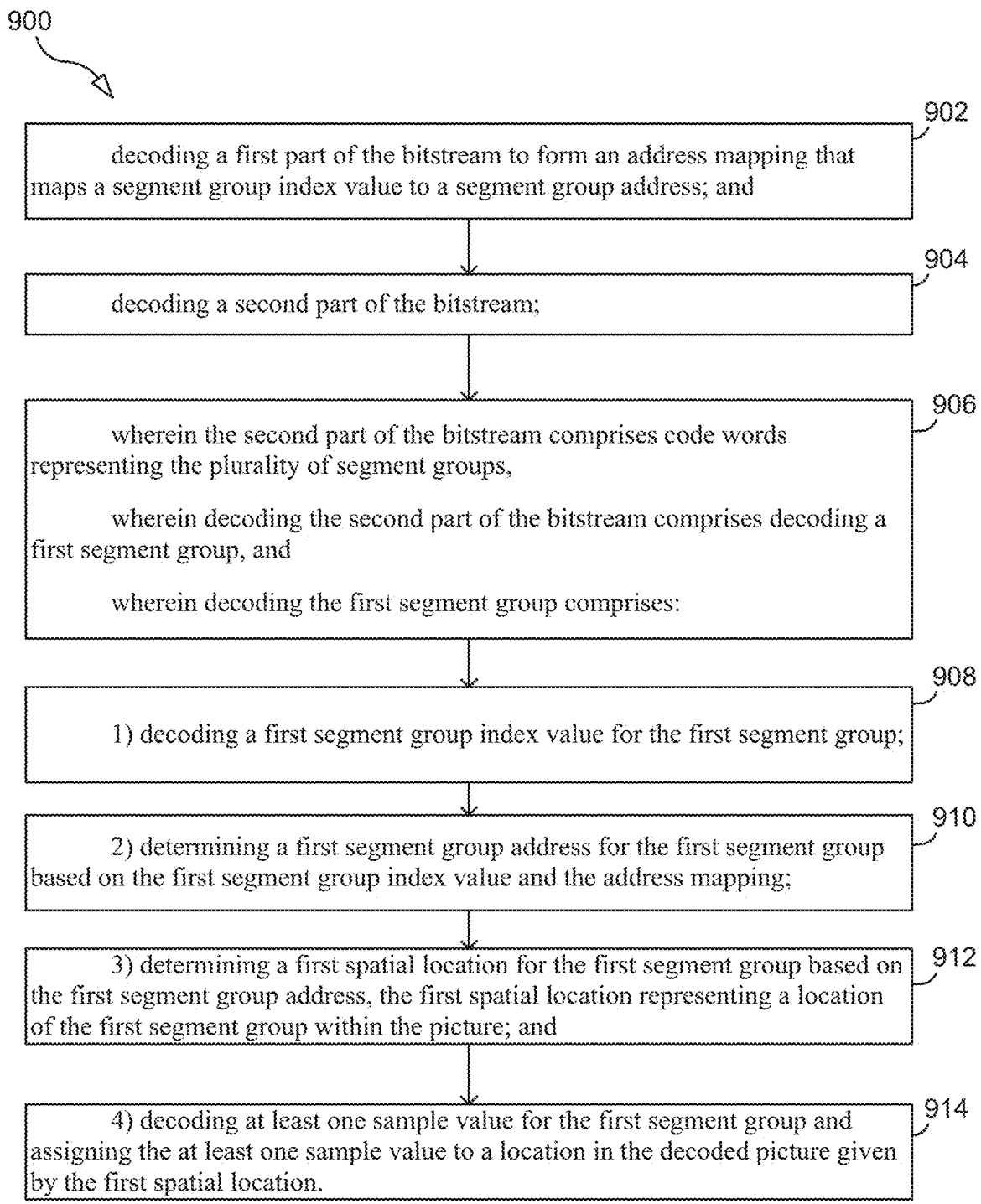
FIG. 9 is a flow chart illustrating a process according to an embodiment.

FIG. 9 is a flow chart illustrating a process according to an embodiment. Process 900 is a method for decoding a picture from a bitstream, the picture being partitioned into a plurality of segment groups. The method includes decoding a first part of the bitstream to form an address mapping that maps a segment group index value to a segment group address (step 902); and decoding a second part of the bitstream (step 904). The second part of the bitstream comprises code words representing the plurality of segment groups. Decoding the second part of the bitstream comprises decoding a first segment group (step 906). Decoding the first segment group includes: 1) decoding a first segment group index value for the first segment group (step 908); 2) determining a first segment group address for the first segment group based on the first segment group index value and the address mapping (step 910); 3) determining a first spatial location for the first segment group based on the first segment group address, the first spatial location representing a location of the first segment group within the picture (step 912); and 4) decoding at least one sample value for the first segment group and assigning the at least one sample value to a location in the decoded picture given by the first spatial location (step 914).

In some embodiments, the address mapping includes one or more of an array and/or list, a parallel set of arrays and/or lists, a hash map, and an associative array. In embodiments, decoding the first part of the bitstream to form the address mapping comprises: decoding from the bitstream a first value indicating a number of list values; and forming a list by decoding from the bitstream a number of list values, the number of list values being equal to the first value. In embodiments, determining the first segment group address for the first segment group based on the first segment group index value and the address mapping comprises performing a lookup operation using the first segment group index value.

In some embodiments, decoding the first part of the bitstream to form the address mapping comprises: decoding from the bitstream a first value indicating a number of list values; and forming a first list (KEY) and a second list (VALUE) by decoding from the bitstream a number of values representing key-value pairs k and v, the number of key-value pairs being equal to the first value. The first list includes the keys k and the second list includes the values v of the key-value pairs, and an ordering of the first list and the second list is such that for a given key-value pair, an index for the given key k in the first list corresponds to an index for the given value v in the second list. In embodiments, decoding the first part of the bitstream to form the address mapping includes decoding from the bitstream a first value indicating a number of hash values; and forming a hash map by decoding from the bitstream a number of values representing key-value pairs k and v, the number of key-value pairs being equal to the first value, wherein for a given key-value pair, an index for the given key k is mapped by the hash map to a given value v.

In some embodiments, determining the first segment group address for the first segment group based on the first segment group index value and the address mapping comprises: determining an index (i) such that the value corresponding to the index in the first list (KEY[i]) matches the first segment group index value; and determining the first segment group address to be the value corresponding to the index in the second list (VALUE[i]). In some embodiments, determining the first segment group address for the first segment group based on the first segment group index value and the address mapping comprises performing a hash lookup operation using the first segment group index value. In some embodiments, the values representing key-value pairs k and v that are decoded comprise a delta value representing the key k, such that for the first key-value pair the key k is determined by the delta value and for other key-value pairs the key k is determined by adding the delta value to a previously determined key value to generate the current key k.

In some embodiments, segment groups correspond to tile groups, subpictures, and/or slices. In some embodiments, a segment group comprises one or more segments, and in some embodiments, a segment group comprises only one segment.

In embodiments, segment groups correspond to tile groups. In embodiments, the first part of the bitstream is comprised in a parameter set, and the method further comprises decoding additional segment groups, wherein the address mapping is used for decoding the additional segment groups. In embodiments, the first part of the bitstream is comprised in a parameter set, and the method further comprises decoding additional pictures, wherein the address mapping is used for decoding the additional pictures. That is, a picture may be encoded into multiple segment groups, and each segment group of the picture may be decoded by using the same address mapping that was transmitted in the parameter set. Furthermore, multiple pictures may be encoded as part of the stream, and each such picture may also be decoded by using the same address mapping that was transmitted in the parameter set.

Figure 10:
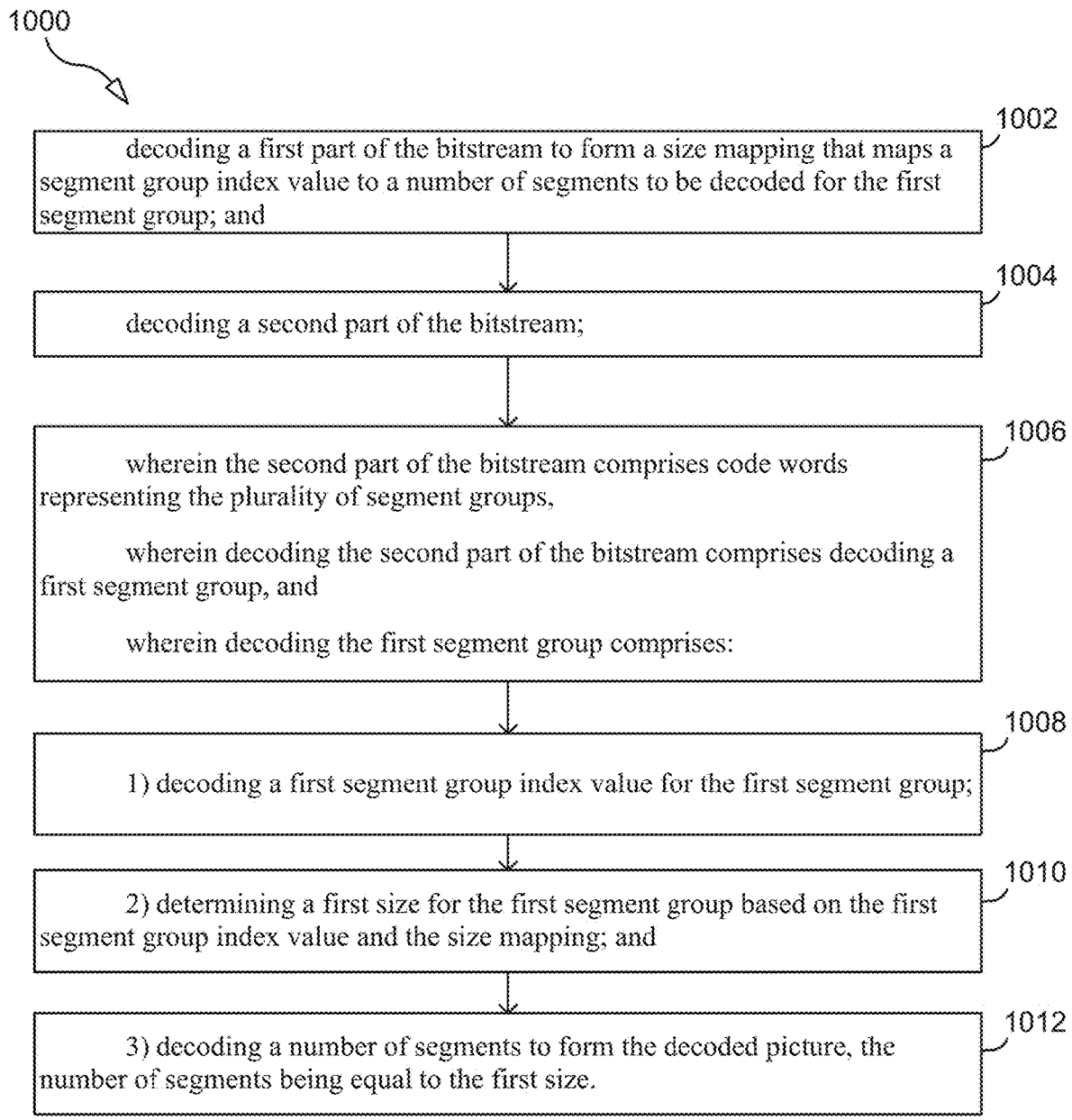
FIG. 10 is a flow chart illustrating a process according to an embodiment.

FIG. 10 is a flow chart illustrating a process according to an embodiment. Process 1000 is a method for decoding a picture from a bitstream, the picture being partitioned into a plurality of segment groups. The method includes decoding a first part of the bitstream to form a size mapping that maps a segment group index value to a number of segments to be decoded for the first segment group (step 1002); and decoding a second part of the bitstream (step 1004). The second part of the bitstream comprises code words representing the plurality of segment groups. Decoding the second part of the bitstream comprises decoding a first segment group (step 1006). Decoding the first segment group comprises: 1) decoding a first segment group index value for the first segment group (step 1008); 2) determining a first size for the first segment group based on the first segment group index value and the size mapping (step 1010); and 3) decoding a number of segments to form the decoded picture, the number of segments being equal to the first size (step 1012).

In some embodiments, the size mapping includes one or more of an array and/or list, a parallel set of arrays and/or lists, a hash map, and an associative array. In embodiments, decoding the first part of the bitstream to form the size mapping comprises: decoding from the bitstream a first value indicating a number of list values; and forming a list by decoding from the bitstream a number of list values, the number of list values being equal to the first value. In embodiments, determining the first size for the first segment group based on the first segment group index value and the size mapping comprises performing a lookup operation using the first segment group index value.

In some embodiments, segment groups correspond to tile groups, subpictures, and/or slices. In some embodiments, a segment group comprises one or more segments, and in some embodiments, a segment group comprises only one segment.

Figure 11:
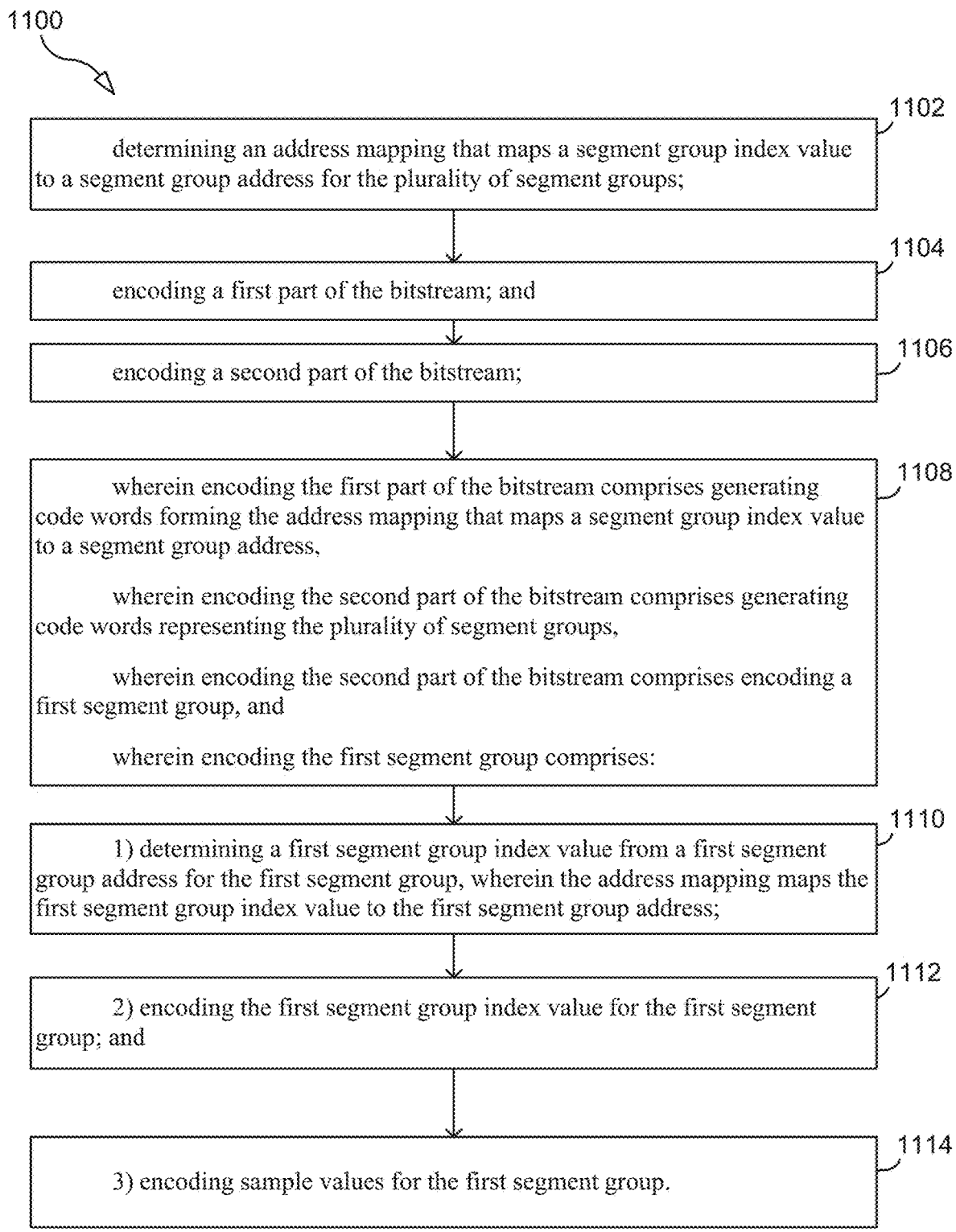
FIG. 11 is a flow chart illustrating a process according to an embodiment.

FIG. 11 is a flow chart illustrating a process according to an embodiment. Process 1100 is a method for encoding a picture into a bitstream, the picture being partitioned into a plurality of segment groups. The method includes determining an address mapping that maps a segment group index value to a segment group address for the plurality of segment groups (step 1102); encoding a first part of the bitstream (step 1104); and encoding a second part of the bitstream (step 1106). Encoding the first part of the bitstream comprises generating code words forming the address mapping that maps a segment group index value to a segment group address. Encoding the second part of the bitstream comprises generating code words representing the plurality of segment groups. Encoding the second part of the bitstream comprises encoding a first segment group (step 1108). Encoding the first segment group comprises: 1) determining a first segment group index value from a first segment group address for the first segment group, wherein the address mapping maps the first segment group index value to the first segment group address (step 1110); 2) encoding the first segment group index value for the first segment group (step 1112); and 3) encoding sample values for the first segment group (step 1114).

The address mapping may map an index value to an address value by, for example, taking the index value as an input and returning the address value as an output. For example, an array or list may map an index value i to a given address value by returning the i-th element of the array or list; similarly, a hash map may map an index value i to a given address by returning the value associated with the key i. Other ways to map an index to a value are possible and encompassed by embodiments provided here.

Figure 12:
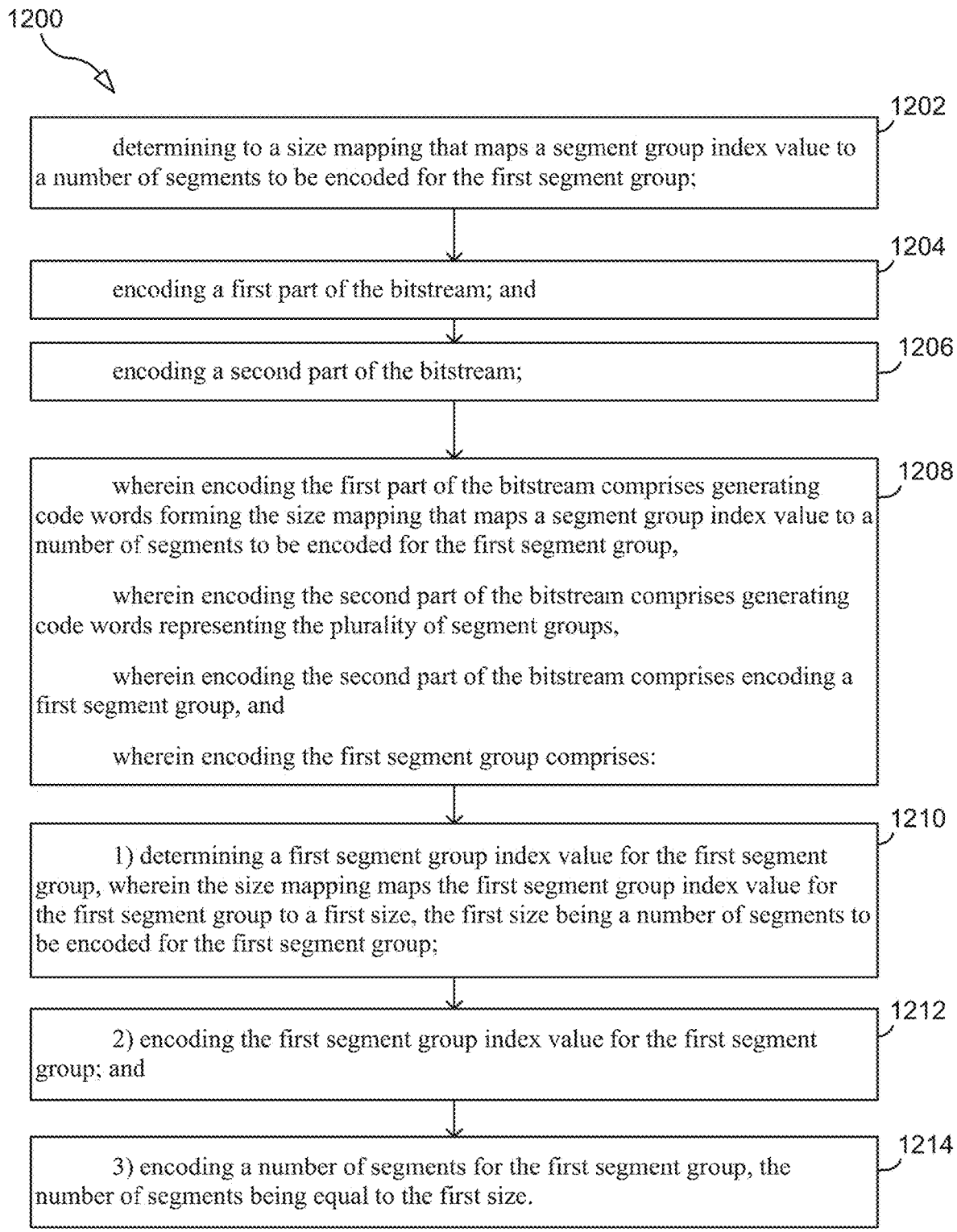
FIG. 12 is a flow chart illustrating a process according to an embodiment.

FIG. 12 is a flow chart illustrating a process according to an embodiment. Process 1200 is a method for encoding a picture into a bitstream, the picture being partitioned into a plurality of segment groups. The method includes determining a size mapping that maps a segment group index value to a number of segments to be encoded for a first segment group (step 1202); encoding a first part of the bitstream (step 1204); and encoding a second part of the bitstream (step 1206). Encoding the first part of the bitstream comprises generating code words forming the size mapping that maps a segment group index value to a number of segments to be encoded for the first segment group. Encoding the second part of the bitstream comprises generating code words representing the plurality of segment groups. Encoding the second part of the bitstream comprises encoding a first segment group (step 1208). Encoding the first segment group comprises: 1) determining a first segment group index value for the first segment group, wherein the size mapping maps the first segment group index value for the first segment group to a first size, the first size being a number of segments to be encoded for the first segment group (step 1210); 2) encoding the first segment group index value for the first segment group (step 1212); and 3) encoding a number of segments for the first segment group, the number of segments being equal to the first size (step 1214).

In some embodiments, encoding the first segment group index value comprises generating one or more code words representing the first segment group index value.

Figure 13:
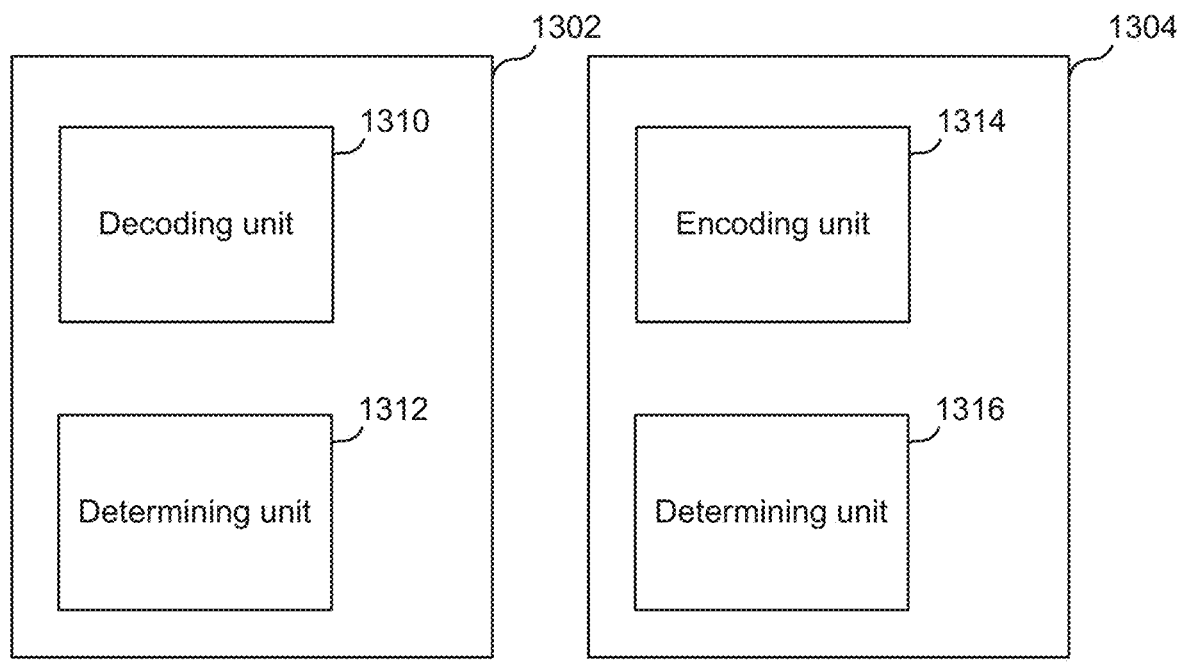
FIG. 13 is a diagram showing functional units of an encoder and a decoder, according to embodiments.

FIG. 13 is a diagram showing functional units of a decoder 1302 and an encoder 1304, according to embodiments. Decoder 1302 includes a decoding unit 1310 and a determining unit 1312. Encoder 1304 includes an encoding unit 1314 and a determining unit 1316.

In an embodiment, the decoding unit 1310 is configured to decode a first part of the bitstream to form an address mapping that maps a segment group index value to a segment group address; and is further configured to decode a second part of the bitstream. The second part of the bitstream comprises code words representing the plurality of segment groups. Decoding the second part of the bitstream comprises decoding a first segment group. Decoding the first segment group includes: 1) decoding (by the decoding unit 1310) a first segment group index value for the first segment group; 2) determining (by the determining unit 1312) a first segment group address for the first segment group based on the first segment group index value and the address mapping; 3) determining (by the determining unit 1312) a first spatial location for the first segment group based on the first segment group address, the first spatial location representing a location of the first segment group within the picture; and 4) decoding (by the decoding unit 1310) at least one sample value for the first segment group and assigning the at least one sample value to a location in the decoded picture given by the first spatial location.

In an embodiment, decoding unit 1310 is configured to decode a first part of the bitstream to form a size mapping that maps a segment group index value to a number of segments to be decoded for the first segment group; and is further configured to decode a second part of the bitstream. The second part of the bitstream comprises code words representing the plurality of segment groups. Decoding the second part of the bitstream comprises decoding a first segment group. Decoding the first segment group comprises: 1) decoding (by the decoding unit 1310) a first segment group index value for the first segment group; 2) determining (by the determining unit 1312) a first size for the first segment group based on the first segment group index value and the size mapping; and 3) decoding (by the decoding unit 1310) a number of segments to form the decoded picture, the number of segments being equal to the first size.

In an embodiment, determining unit 1316 is configured to determine an address mapping that maps a segment group index value to a segment group address for the plurality of segment groups. The encoding unit 1314 is configured to encode a first part of the bitstream; and is further configured to encode a second part of the bitstream. The first part of the bitstream comprises code words forming the address mapping that maps a segment group index value to a segment group address. The second part of the bitstream comprises code words representing the plurality of segment groups. Encoding the second part of the bitstream comprises encoding a first segment group. Encoding the first segment group comprises: 1) determining (by the determining unit 1316) a first segment group index value from a first segment group address for the first segment group, wherein the address mapping maps the first segment group index value to the first segment group address; 2) encoding (by the encoding unit 1314) the first segment group index value for the first segment group; and 3) encoding (by the encoding unit 1314) sample values for the first segment group.

In an embodiment, determining unit 1316 is configured to determine a size mapping that maps a segment group index value to a number of segments to be encoded for the first segment group. The encoding unit 1314 is configured to encode a first part of the bitstream; and is further configured to encode a second part of the bitstream. The first part of the bitstream comprises code words forming the size mapping that maps a segment group index value to a number of segments to be encoded for the first segment group. The second part of the bitstream comprises code words representing the plurality of segment groups. Encoding the second part of the bitstream comprises encoding a first segment group. Encoding the first segment group comprises: 1) determining (by the determining unit 1316) a first segment group index value for the first segment group, wherein the size mapping maps the first segment group index value for the first segment group to a first size, the first size being a number of segments to be encoded for the first segment group; 2) encoding (by the encoding unit 1314) the first segment group index value for the first segment group; and 3) encoding (by the encoding unit 1314) a number of segments for the first segment group, the number of segments being equal to the first size.

Figure 14:
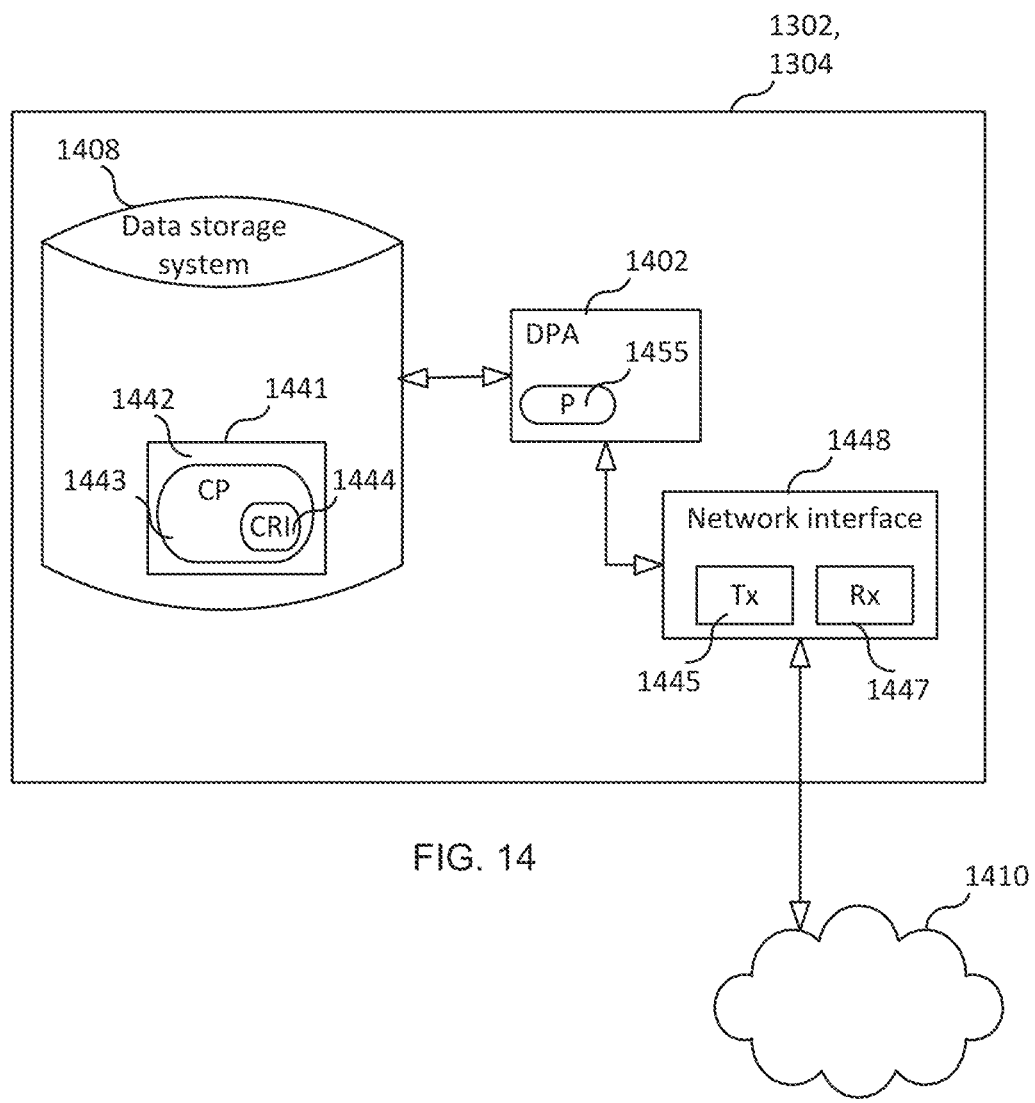
FIG. 14 is a blog diagram of an encoder and/or decoder, according to embodiments.

FIG. 14 is a block diagram of a node (e.g., encoder 1302 and/or decoder 1304), according to some embodiments. As shown in FIG. X, the node may comprise: processing circuitry (PC) 1402, which may include one or more processors (P) 1455 (e.g., a general purpose microprocessor and/or one or more other processors, such as an application specific integrated circuit (ASIC), field-programmable gate arrays (FPGAs), and the like); a network interface 1448 comprising a transmitter (Tx) 1445 and a receiver (Rx) 1447 for enabling the node to transmit data to and receive data from other nodes connected to a network 1410 (e.g., an Internet Protocol (IP) network) to which network interface 1448 is connected; and a local storage unit (a.k.a., "data storage system") 1408, which may include one or more non-volatile storage devices and/or one or more volatile storage devices. In embodiments where PC 1402 includes a programmable processor, a computer program product (CPP) 1441 may be provided. CPP 1441 includes a computer readable medium (CRM) 1442 storing a computer program (CP) 1443 comprising computer readable instructions (CRI) 1444. CRM 1042 may be a non-transitory computer readable medium, such as, magnetic media (e.g., a hard disk), optical media, memory devices (e.g., random access memory, flash memory), and the like. In some embodiments, the CRI 1444 of computer program 1443 is configured such that when executed by PC 1402, the CRI causes the node to perform steps described herein (e.g., steps described herein with reference to the flow charts). In other embodiments, the node may be configured to perform steps described herein without the need for code. That is, for example, PC 1402 may consist merely of one or more ASICs. Hence, the features of the embodiments described herein may be implemented in hardware and/or software.

While various embodiments of the present disclosure are described herein, it should be understood that they have been presented by way of example only, and not limitation. Thus, the breadth and scope of the present disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method of operating a decoder to decode a picture from a bitstream, the picture being partitioned into a plurality of segment groups, the method comprising:
   decoding a first part of the bitstream to form an address mapping that maps a segment group index value to a segment group address; and
   decoding a second part of the bitstream,
   wherein the second part of the bitstream comprises code words representing the plurality of segment groups,
   wherein decoding the second part of the bitstream comprises decoding a first segment group, and
   wherein decoding the first segment group comprises:
      decoding a first segment group index value for the first segment group;
      determining a first segment group address for the first segment group based on the first segment group index value and the address mapping;
      determining a first spatial location for the first segment group based on the first segment group address, the first spatial location representing a location of the first segment group within the picture; and
      decoding at least one sample value for the first segment group and assigning the at least one sample value to a location in the decoded picture given by the first spatial location.

2. The method of claim 1, wherein the address mapping includes one or more of an array and/or list, a parallel set of arrays and/or lists, a hash map, and an associative array.

3. The method of claim 1, wherein decoding the first part of the bitstream to form the address mapping comprises:
   decoding from the bitstream a first value indicating a number of list values; and
   forming a list by decoding from the bitstream a number of list values, the number of list values being equal to the first value.

4. The method of claim 1, wherein determining the first segment group address for the first segment group based on the first segment group index value and the address mapping comprises performing a lookup operation using the first segment group index value.

5. The method of claim 1, wherein decoding the first part of the bitstream to form the address mapping comprises:
   decoding from the bitstream a first value indicating a number of list values; and
   forming a first list (KEY) and a second list (VALUE) by decoding from the bitstream a number of values representing key-value pairs k and v, the number of key-value pairs being equal to the first value, wherein the first list includes the keys k and the second list includes the values v of the key-value pairs, and wherein an ordering of the first list and the second list is such that for a given key-value pair, an index for the given key k in the first list corresponds to an index for the given value v in the second list.

6. The method of claim 1, wherein decoding the first part of the bitstream to form the address mapping comprises:
   decoding from the bitstream a first value indicating a number of hash values; and
   forming a hash map by decoding from the bitstream a number of values representing key-value pairs k and v, the number of key-value pairs being equal to the first value, wherein for a given key-value pair, an index for the given key k is mapped by the hash map to a given value v.

7. The method of claim 5, wherein determining the first segment group address for the first segment group based on the first segment group index value and the address mapping comprises:
   determining an index (i) such that the value corresponding to the index in the first list (KEY[i]) matches the first segment group index value; and
   determining the first segment group address to be the value corresponding to the index in the second list (VALUE[i]).

8. The method of claim 5, wherein determining the first segment group address for the first segment group based on the first segment group index value and the address mapping comprises performing a hash lookup operation using the first segment group index value.

9. The method of claim 5, wherein the values representing key-value pairs k and v that are decoded comprise a delta value representing the key k, such that for the first key-value pair the key k is determined by the delta value and for other key-value pairs the key k is determined by adding the delta value to a previously determined key value to generate the current key k.

10. The method of claim 1, wherein segment groups correspond to tile groups.

11. The method of claim 1, wherein segment groups correspond to subpictures.

12. The method of claim 1, wherein a segment corresponds to a slice.

13. The method of claim 1, wherein a segment group comprises one or more segments.

14. The method of claim 1, wherein a segment group comprises only one segment.

15. The method of claim 1, wherein the first part of the bitstream is comprised in a parameter set,
the method further comprising decoding additional segment groups using the address mapping.

16. The method of claim 1, wherein the first part of the bitstream is comprised in a parameter set,
the method further comprising decoding additional pictures using the address mapping.

17. A method of operating an encoder to encode a picture into a bitstream, the picture being partitioned into a plurality of segment groups, the method comprising:
determining an address mapping that maps a segment group index value to a segment group address for the plurality of segment groups;
encoding a first part of the bitstream; and
encoding a second part of the bitstream,
wherein encoding the first part of the bitstream comprises generating code words forming the address mapping that maps a segment group index value to a segment group address,
wherein encoding the second part of the bitstream comprises generating code words representing the plurality of segment groups,
wherein encoding the second part of the bitstream comprises encoding a first segment group, and
wherein encoding the first segment group comprises:
determining a first segment group index value from a first segment group address for the first segment group, wherein the address mapping maps the first segment group index value to the first segment group address;
encoding the first segment group index value for the first segment group; and
encoding sample values for the first segment group.

18. The method of claim 17, wherein encoding the first segment group index value comprises generating one or more code words representing the first segment group index value.

19. A decoder configured to decode a picture from a bitstream, the picture being partitioned into a plurality of segment groups, the decoder comprising:
processing circuitry; and
memory coupled to the processing circuitry and having instructions stored therein that are executable by the processing circuitry to cause the decoder to perform operations comprising:
decoding a first part of the bitstream to form an address mapping that maps a segment group index value to a segment group address;
decoding a second part of the bitstream,
wherein the second part of the bitstream comprises code words representing the plurality of segment groups,
wherein decoding the second part of the bitstream comprises decoding a first segment group, and
wherein decoding the first segment group comprises:
decoding a first segment group index value for the first segment group;
determining a first segment group address for the first segment group based on the first segment group index value and the address mapping;
determining a first spatial location for the first segment group based on the first segment group address, the first spatial location representing a location of the first segment group within the picture; and
decoding at least one sample value for the first segment group and assigning the at least one sample value to a location in the decoded picture given by the first spatial location.

20. An encoder configured to encode a picture from a bitstream, the picture being partitioned into a plurality of segment groups, the encoder comprising:
processing circuitry; and
memory coupled to the processing circuitry and having instructions stored therein that are executable by the processing circuitry to cause the encoder to perform operations comprising:
determining an address mapping that maps a segment group index value to a segment group address for the plurality of segment groups;
encoding a first part of the bitstream;
encoding a second part of the bitstream,
wherein encoding the first part of the bitstream comprises generating code words forming the address mapping that maps a segment group index value to a segment group address,
wherein encoding the second part of the bitstream comprises generating code words representing the plurality of segment groups,
wherein encoding the second part of the bitstream comprises encoding a first segment group, and
wherein encoding the first segment group comprises:
determining a first segment group index value from a first segment group address for the first segment group, wherein the address mapping maps the first segment group index value to the first segment group address;
encoding the first segment group index value for the first segment group; and
encoding sample values for the first segment group.

* * * * *